(12) United States Patent
Matsubara et al.

(10) Patent No.: US 7,680,914 B2
(45) Date of Patent: Mar. 16, 2010

(54) AUTONOMOUS CONTROL APPARATUS, AUTONOMOUS CONTROL METHOD, AND COMPUTER PRODUCT

(75) Inventors: Masazumi Matsubara, Kawasaki (JP); Akira Katsuno, Kawasaki (JP); Toshihiko Hirabayashi, Kawasaki (JP); Yasumasa Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1132 days.

(21) Appl. No.: 10/951,932

(22) Filed: Sep. 28, 2004

(65) Prior Publication Data

US 2005/0268148 A1    Dec. 1, 2005

(30) Foreign Application Priority Data

May 31, 2004    (JP)    ............... 2004-162442

(51) Int. Cl.
    *G06F 15/173*    (2006.01)
(52) U.S. Cl. .................... 709/223; 709/226
(58) Field of Classification Search ................ 709/223, 709/226
    See application file for complete search history.

(56) References Cited

U.S. PATENT DOCUMENTS

| | | | | |
|---|---|---|---|---|
| 4,727,487 | A * | 2/1988 | Masui et al. ................. | 706/57 |
| 4,890,227 | A | 12/1989 | Watanabe et al. | |
| 5,996,013 | A | 11/1999 | Delp et al. | |
| 6,038,673 | A | 3/2000 | Benn et al. | |
| 6,636,988 | B1 | 10/2003 | Firley et al. | |
| 7,249,179 | B1 * | 7/2007 | Romero et al. ............. | 709/226 |
| 2002/0184484 | A1 | 12/2002 | Abboud et al. | |
| 2003/0115495 | A1 | 6/2003 | Rawson, III | |
| 2003/0126202 | A1 | 7/2003 | Watt | |
| 2004/0181476 | A1 * | 9/2004 | Smith et al. ................. | 705/35 |

FOREIGN PATENT DOCUMENTS

| | | |
|---|---|---|
| EP | 1 047 226 | 10/2000 |
| JP | 2000-316025 | 11/2000 |
| JP | 2001-265726 | 9/2001 |
| JP | 2004-512610 | 4/2004 |
| WO | WO 01/50290 | 7/2001 |
| WO | WO 02/35312 | 5/2002 |
| WO | WO 03/083734 | 10/2003 |

OTHER PUBLICATIONS

2nd International Workshop on Requirements Engineering for High Assurance Systems (RHAS '03); Carnegie Mellon Software Engineering Institute; Sep. 9, 2003, Monterey Bay, CA; pp. 1-66.

(Continued)

*Primary Examiner*—William C Vaughn, Jr.
*Assistant Examiner*—Umar Cheema
(74) *Attorney, Agent, or Firm*—Greer, Burns & Crain, Ltd.

(57) ABSTRACT

An apparatus for autonomously controlling an information processing system made up of a plurality of information processing apparatuses connected via a network includes a policy storing unit that stores a policy required for managing the information processing system, and a control performing unit that performs an autonomous control based on the policy stored.

13 Claims, 35 Drawing Sheets

OTHER PUBLICATIONS

Unicenter Remote Control; Computer Associates Int'l., Inc.; 2001.

"Server Technology"; <URL:http://www.ibm.com/ibm/licensing/patents/server.shtml>.

Hiroki Tanaka et al.; "Special Feature-A Vision of Information Sharing Platform for Network Society in the 21$^{st}$ Century, Part III, Toward Providing High-Quality e-Business Application Services"; NTT Technical Journal, The Telecommunications Association, vol. 13, No. 2, pp. 44-48, Feb. 1, 2001; (Patent Office CSDB No.: Company's technical journal 2003-00084-005).

Toshiya Watanabe et al.; "A Distributed Data Driven Architecture for Operations Support systems"; Technical Report of IEICI, The Institute of Electronics, Information and Communication Engineers, vol. 103, No. 442, pp. 93-98, Nov. 13, 2003; (Patent Office CSDB No.: Papers of Domestic Conferences 2005-00093-016).

"Hitachi Open Middleware High System Availability With 'JP1' for Centrally Managed Center Server, SLA Requires Precise Operation Analysis for High Level Service"; Nikkei Computer, Nikkei Business Publications, Inc., No. 594, pp. 84-85, Feb 23, 2004; (Patent Office CSDB No.: Domestic Technical Journal 2004- 01074-004).

"Valumo aims for Autonomy, Distribution, Virtualization, and Cooperation", OPEN Enterprise magazine, Socius Japan, Inc., vol. 1, No. 1, pp. 62-65, Dec 1, 2003; (Patent Office CSDB No.: Domestic Technical Journal 2006-00010-007).

Dornwaß et al.; "Windows NT 4.0"; 1997/1998; ISBN 3-89360-930-X; pp. 71-83; HB.

\* cited by examiner

| PHYSICAL SERVER | MODEL NUMBER |
|---|---|
| PSvr1 | A |
| PSvr2 | B |
| PSvr3 | B |
| PSvr4 | A |
| PSvr5 | C |
| PSvr6 | A |
| PSvr7 | B |

| MODEL NUMBER | SPECIFICATIONS | VALUE IN PERFOR- MANCE |
|---|---|---|
| A | CPU : 1GHz 、 MEM : 1GB 、 BAND: 100Mbps | 1GTPM |
| B | CPU : 800MHz 、 MEM : 512MB 、 BAND: 100Mbps | 800MTPM |
| C | CPU : 1.5GHz 、 MEM : 1GB 、 BAND: 100Mbps | 1.5GTPM |

FIG.13

| PHYSICAL NETWORK | MODEL NUMBER |
|---|---|
| PRT1 | D |
| PRT1 | E |
| PRT2 | F |
| PRT3 | F |

FIG.14

| MODEL NUMBER | SPECIFICATIONS | VALUE IN PERFORMANCE |
|---|---|---|
| D | 10/100BASE×16 PORT、 1000BASE×4 PORT | - |
| E | 10/100BASE×8 PORT、 1000BASE×2 PORT | - |
| F | 10/100BASE×4 PORT、 1000BASE×2 PORT | - |

FIG.15

| PHYSICAL STORAGE | MODEL NUMBER |
|---|---|
| PDB1 | G |

FIG.16

| MODEL NUMBER | SPECIFICATIONS | VALUE IN PERFORMANCE |
|---|---|---|
| G | CAPACITY: 16TB | – |

FIG.17

| LINK NUMBER | CONNECTION SOURCE | CONNECTION DESTINATION |
|---|---|---|
| 1 | PSvr1 | PSW1 |
| 2 | PSvr2 | PSW1 |
| 3 | PSvr3 | PSW1 |
| 4 | PSvr4 | PSW2 |
| 5 | PSvr5 | PSW3 |
| 6 | | PDB1 |
| 7 | PSvr6 | PSW1 |
| 8 | | PSW2 |
| 9 | PSvr7 | PSW1 |
| 10 | PRT1 | PSW1 |
| 11 | PSW1 | PSvr1 |
| 12 | | PSvr2 |
| 13 | | PSW2 |
| 14 | | PSvr3 |
| 15 | | PSvr6 |
| 16 | | PSvr7 |
| 17 | PSW2 | PSW1 |
| 18 | | PSvr4 |
| 19 | | PSvr6 |
| 20 | PSW3 | PSW2 |
| 21 | | PSvr5 |
| 22 | PDB1 | PSvr5 |

FIG.18

| PHYSICAL RESOURCE | LOGICAL RESOURCE |
|---|---|
| PSvr1 | LSvr1 |
| PSvr2 | LSvr2 |
| PSvr3 | LSvr5 |
| PSvr4 | LSvr3 |
| PSvr5 | LSvr4 |
| PSvr6 | - |
| PSvr7 | LSvr2 |
| PRT1 | LRT1 |
| PDB1 | LDB1 |

FIG.19

| LOGICAL SERVER | TYPE |
|---|---|
| LSvr1 | A |
| LSvr2 | B |
| LSvr3 | A |
| LSvr4 | C |
| LSvr5 | B |

FIG.20

| TYPE | SOFTWARE | REQUIRED CONDITION |
|---|---|---|
| A | OS1、MW1、APP1 | MEMORY:1GB |
| B | OS2、MW2、APP2 | MEMORY:256MB |
| C | OS3、MW3 | MEMORY:1GB、VALUE IN PERFORMANCE:1.2GTPM |

FIG.21

| LOGICAL NETWORK | TYPE |
|---|---|
| LRT1 | D |

FIG.22

| TYPE | REQUIRED CONDITION |
|---|---|
| D | NONE |

FIG.23

| LOGICAL STORAGE | TYPE |
|---|---|
| LDB 1 | E |

FIG.24

| TYPE | REQUIRED CONDITION |
|---|---|
| E | CAPACITY: 4TB |

FIG.25

| LINK NUMBER | CONNECTION SOURCE | CONNECTION DESTINATION |
|---|---|---|
| 1 | LSvr1 | LRT1 |
| 2 | | LSvr3 |
| 3 | LSvr2 | LRT1 |
| 4 | | LSvr3 |
| 5 | LSvr3 | LSvr1 |
| 6 | | LSvr2 |
| 7 | | LSvr4 |
| 8 | | LSvr5 |
| 9 | LSvr4 | LSvr3 |
| 10 | | LDB1 |
| 11 | LSvr5 | LRT1 |
| 12 | | LSvr3 |
| 13 | LRT1 | LSvr1 |
| 14 | | LSvr2 |
| 15 | | LSvr5 |
| 16 | LDB1 | LSvr4 |

FIG.26

| LOGICAL SERVER | CORRESPONDING SERVICE LAYER |
|---|---|
| LSvr1 | WEB LAYER OF SERVICE 1 |
| LSvr2 | WEB LAYER OF SERVICE 2 |
| LSvr3 | AP LAYER OF SERVICE 1<br>AP LAYER OF SERVICE 2 |
| LSvr4 | DB LAYER OF SERVICE 1<br>DB LAYER OF SERVICE 2 |

FIG.27

| LOGICAL STORAGE | CORRESPONDING SERVICE LAYER |
|---|---|
| LDB1 | DB LAYER OF SERVICE 1<br>DB LAYER OF SERVICE 2 |

FIG.28

| LOGICAL SERVER | CORRESPONDING SERVICE LAYER |
|---|---|
| LRT1 | FRONT LAYER OF SERVICE 1<br>FRONT LAYER OF SERVICE 2 |

FIG.29

|  |  | IN-SERVICE | STANDBY POOL | BARE METAL POOL |
|---|---|---|---|---|
| SERVICE 1 | FRONT LAYER | LRT1 | - | - |
|  | WEB LAYER | LSvr1 | - | - |
|  | AP LAYER | LSvr3 | - | PSvr6 |
|  | DB LAYER | LSvr4 | - | - |
|  |  | LDB1 |  |  |
| SERVICE 2 | FRONT LAYER | LRT1 | - | - |
|  | WEB LAYER | LSvr2 | LSvr5 | PSvr6 |
|  | AP LAYER | LSvr3 | - | - |
|  | DB LAYER | LSvr4 | - | - |
|  |  | LDB1 |  |  |

FIG.30

| MODEL NUMBER | PHYSICAL SERVER |
|---|---|
| A | PSvr6 |
| B | - |
| C | - |

FIG. 36A

| | FAILURE | | | | |
|---|---|---|---|---|---|
| | (a) MONITORING & MEASUREMENT | (b) ANALYSIS | (c) DESIGN | (d) VERIFICATION | (e) OPERATION |
| (2) WORKGROUP SERVICE MANAGER | | | | | |
| (3) WORKGROUP SYSTEM RESOURCE MANAGER | ※NOTE 2 | RANGE: ENTIRE SYSTEM FUNCTION: SPECIFY INFLUENCED RANGE→[(3)-(c)] | RANGE: ENTIRE SYSTEM FUNCTION: DESIGN RECOVERY SCHEME (SCALING-OUT TYPE/ SCALING-IN TYPE)※NOTE 1 WITH PLAN→[(3)-(d)],[(5)-(d)], [(6)-(d)],[(7)-(d)] WITHOUT PLAN→DISPLAY WARNING TO OPERATOR FOR END | RANGE: ENTIRE SYSTEM FUNCTION: VERIFY SOFTWARE AND SYSTEM AND ORGANIZE VERIFICATION RESULTS OK→INSTRUCT FOR OPERATION[(3)-(e)], [(5)-(e)],[(6)-(e)],[(7)-(e)] NG→REDESIGN[(3)-(c)] | RANGE: SOFTWARE IN ENTIRE SYSTEM FUNCTION: PERFORM RECOVERY OPERATION (SWITCH/DEGENERATION, SETTING CHANGE)→[(9)-(e)] |
| (5) WORKGROUP SERVER RESOURCE MANAGER | RANGE: PLURAL SERVER NODES FUNCTION: MONITOR LIFE AND DEATH OF SERVER NODE→[(5)-(b)] | RANGE: PLURAL SERVER NODES FUNCTION: SPECIFY FAILED PORTION (INCLUDING SYMPTOM ANALYSIS)→[(3)-(b)] | | RANGE: PLURAL SERVER NODES FUNCTION: VERIFY SERVER CONFIGURATION IN RECOVERY PLAN→[(3)-(d)] | RANGE: PLURAL SERVER NODES FUNCTION: PERFORM RECOVERY OPERATION (SWITCH/DEGENERATION, SETTING CHANGE)→[(13)-(e)] |
| (6) WORKGROUP STORAGE RESOURCE MANAGER | RANGE: PLURAL STORAGE NODES FUNCTION: MONITOR FAILURE OF STORAGE RESOURCE→[(6)-(b)] | RANGE: PLURAL STORAGE NODES FUNCTION: SPECIFY FAILED PORTION (INCLUDING SYMPTOM ANALYSIS)→[(3)-(b)] | | RANGE: PLURAL STORAGE NODES FUNCTION: VERIFY STORAGE CONFIGURATION IN RECOVERY PLAN→[(3)-(d)] | RANGE: PLURAL STORAGE NODES FUNCTION: PERFORM RECOVERY OPERATION (SWITCH/DEGENERATION, SETTING CHANGE)→[(14)-(e)],[(16)-(e)] |
| (7) WORKGROUP NETWORK RESOURCE MANAGER | RANGE: PLURAL NETWORK NODES FUNCTION: MONITOR FAILURE OF NETWORK RESOURCE→[(7)-(b)] | RANGE: PLURAL NETWORK NODES FUNCTION: SPECIFY FAILED PORTION (INCLUDING SYMPTOM ANALYSIS)→[(3)-(b)] | | RANGE: PLURAL NETWORK NODES FUNCTION: VERIFY NETWORK CONFIGURATION IN RECOVERY PLAN→[(3)-(d)] | RANGE: PLURAL NETWORK NODES FUNCTION: PERFORM RECOVERY OPERATION (SWITCH/DEGENERATION, SETTING CHANGE)→[(15)-(e)],[(17)-(e)] |
| (10) NODE SERVICE MANAGER | | | | | |

NOTE 1: DETERMINE WHICH ONE OF FAILURE RECOVERY AND PERFORMANCE RECOVERY IS PRIORITIZED, ETC.
NOTE 2: TAKE MONITORING OF LIFE AND DEATH OF SOFTWARE AS IMPLEMENT MATTER

FIG. 36B

| | FAILURE | | | | |
|---|---|---|---|---|---|
| | (a) MONITORING & MEASUREMENT | (b) ANALYSIS | (c) DESIGN | (d) VERIFICATION | (e) OPERATION |
| (9) NODE SYSTEM RESOURCE MANAGER | NOTE 2 | RANGE: SERVER NODE FUNCTION: SPECIFY INFLUENCED RANGE RECOVERABLE WITHIN NODE→[(9)-(c)] UNRECOVERABLE WITHIN NODE→[(3)-(b)] | RANGE: SERVER NODE FUNCTION: DESIGN RECOVERY SCHEME (DISTRIBUTION-ADJUSTING-TYPE) WITH PLAN→[(9)-(d)] WITHOUT PLAN→[(3)-(b)] | RANGE: SERVER NODE FUNCTION: VERIFY RECOVERY PLAN OK→INSTRUCT FOR OPERATION[(9)-(e)], [(13)-(e)],[(14)-(e)],[(15)-(e)] NG→REDESIGN[(9)-(c)] | RANGE: SOFTWARE ON SERVER NODE FUNCTION: PERFORM RECOVERY OPERATION (SWITCH/DEGENERATION, SETTING CHANGE) |
| (13) NODE SERVER RESOURCE MANAGER | RANGE: HARDWARE COMPONENT ON SERVER NODE FUNCTION: MONITOR FAILURE→[(9)-(b)] | | | | RANGE: HARDWARE COMPONENT ON SERVER NODE FUNCTION: PERFORM RECOVERY OPERATION (SWITCH/DEGENERATION, SETTING CHANGE) |
| (14) NODE STORAGE RESOURCE MANAGER | RANGE: CONNECTION TO SAN (CABLE, ETC.) FUNCTION: MONITOR FAILURE→[(6)-(a)] | | | | RANGE: CONNECTION TO SAN (CABLE, ETC.) FUNCTION: PERFORM RECOVERY OPERATION (SWITCH/DEGENERATION, SETTING CHANGE) |
| (15) NODE NETWORK RESOURCE MANAGER | RANGE: CONNECTION TO NETWORK NODE (CABLE, ETC.) FUNCTION: MONITOR FAILURE→[(7)-(b)] | | | | RANGE: CONNECTION TO NETWORK NODE (CABLE, ETC.) FUNCTION: PERFORM RECOVERY OPERATION (SWITCH/DEGENERATION, SETTING CHANGE) |
| (16) STORAGE NODE RESOURCE MANAGER | RANGE: STORAGE NODE (FC-SW, RAID, ETC.) FUNCTION: MONITOR FAILURE→[(16)-(b)] | RANGE: STORAGE NODE (FC-SW, RAID) FUNCTION: SPECIFY FAILED PORTION AND INFLUENCED RANGE (INCLUDING SYMPTOM ANALYSIS) RECOVERABLE WITHIN NODE→[(16)-(c)] UNRECOVERABLE WITHIN NODE→[(6)-(b)] | RANGE: STORAGE NODE (FC-SW, RAID, ETC.) FUNCTION: DESIGN RECOVERY SCHEME WITH PLAN→[(16)-(d)] WITHOUT PLAN→[(6)-(b)] | RANGE: STORAGE NODE (FC-SW, RAID, ETC.) FUNCTION: VERIFY RECOVERY PLAN OK→INSTRUCT FOR OPERATION[(16)-(e)] NG→REDESIGN[(16)-(c)] | RANGE: STORAGE NODE (FC-SW, RAID, ETC.) FUNCTION: PERFORM RECOVERY OPERATION (SWITCH/DEGENERATION, SETTING CHANGE) |
| (17) NETWORK NODE RESOURCE MANAGER | RANGE: NETWORK NODE (SW, SLB, ETC.) FUNCTION: MONITOR FAILURE→[(17)-(b)] | RANGE: NETWORK NODE (SW, SLB, ETC.) FUNCTION: SPECIFY FAILED PORTION AND INFLUENCED RANGE (INCLUDING SYMPTOM ANALYSIS) RECOVERABLE WITHIN NODE→[(17)-(c)] UNRECOVERABLE WITHIN NODE→[(7)-(b)] | RANGE: NETWORK NODE (SW, SLB, ETC.) FUNCTION: DESIGN RECOVERY SCHEME WITH PLAN→[(17)-(d)] WITHOUT PLAN→[(17)-(b)] | RANGE: NETWORK NODE (SW, SLB, ETC.) FUNCTION: VERIFY RECOVERY PLAN OK→INSTRUCT FOR OPERATION[(17)-(e)] NG→REDESIGN[(17)-(c)] | RANGE: NETWORK NODE (SW, SLB, ETC.) FUNCTION: PERFORM RECOVERY OPERATION (SWITCH/DEGENERATION, SETTING CHANGE) |

FIG.37A

| | PERFORMANCE DETERIORATION | | | | |
|---|---|---|---|---|---|
| | (a) MONITORING & MEASURING | (b) ANALYSIS | (c) DESIGN | (d) VERIFICATION | (e) OPERATION |
| (2) WORK-GROUP SERVICE MANAGER | RANGE: ENTIRE SYSTEM FUNCTION: MEASURE SERVICE RESPONSE TIME/ NUMBER OF PROCESSES, AND MEASURE WEB/AP/DB STRING ATTACHMENT →[(2)-(b)] | RANGE: ENTIRE SYSTEM FUNCTION: ANALYZE PERFORMANCE BOTTLENECK BASED ON (2)-(a) AND INFORMATION COLLECTED BY EACH WORKGROUP RESOURCE MANAGER, AND CALCULATE REQUIRED AMOUNT OF RESOURCE→[(3)-(c)] | | | |
| (3) WORK-GROUP SYSTEM RESOURCE MANAGER | | | RANGE: ENTIRE SYSTEM FUNCTION: DESIGN ADJUSTING SCHEME (SCALING-OUT-TYPE/ SCALING-UP-TYPE) ※NOTE1 WITH PLAN→[(3)-(d)],[(5)-(d)], [(6)-(d)],[(7)-(d)] WITHOUT PLAN→DISPLAY WARN-ING TO OPERATOR FOR END | RANGE: ENTIRE SYSTEM FUNCTION: VERIFY SOFT-WARE AND SYSTEM AND ORGANIZE VERIFICATION RESULTS OK→INSTRUCT FOR OPERATION[(3)-(e)], [(5)-(e)],[(6)-(e)],[(7)-(e)] NG→REDESIGN[(3)-(c)] | RANGE: SOFTWARE IN ENTIRE SYSTEM FUNCTION: PERFORM ADJUSTING OPERATION (SWITCH/DEGENERATION, SETTING CHANGE) →[(9)-(e)] |
| (5) WORK-GROUP SERVER RESOURCE MANAGER | | | | RANGE: PLURAL SERVER NODES FUNCTION: VERIFY SERVER CONFIGURATION OF ADJUSTING PLAN →[(3)-(d)] | RANGE: PLURAL SERVER NODES FUNCTION: PERFORM ADJUSTING OPERATION(SWITCH/ DEGENERATION, SETTING CHANGE)→[(13)-(e)] |
| (6) WORK-GROUP STORAGE RESOURCE MANAGER | RANGE: PLURAL STORAGE NODES FUNCTION: COLLECT PERFORMANCE INFORMATION OF STORAGE RESOURCES IN EACH STORAGE NODE AND SERVER NODE→[(6)-(b)] | RANGE: PLURAL STORAGE NODES FUNCTION: CALCULATE REQUIRED/ REDUNDANT AMOUNT OF RESOURCES →[(2)-(b)] | | RANGE: PLURAL STORAGE NODES FUNCTION: VERIFY STORAGE CONFIGURATION OF ADJUSTING PLAN →[(3)-(d)] | RANGE: PLURAL STORAGE NODES FUNCTION: PERFORM ADJUSTING OPERATION (SWITCH/DEGENERATION, SETTING CHANGE) →[(14)-(e)],[(16)-(e)] |
| (7) WORK-GROUP NETWORK RESOURCE MANAGER | RANGE: PLURAL NETWORK NODES FUNCTION: COLLECT PERFORMANCE INFORMATION OF NETWORK RESOURCES IN EACH NETWORK NODE AND SERVER NODE →[(7)-(b)] | RANGE: PLURAL NETWORK NODES FUNCTION: CALCULATE REQUIRED/ REDUNDANT AMOUNT OF RESOURCES →[(2)-(b)] | | RANGE: PLURAL NETWORK NODES FUNCTION: VERIFY NETWORK CONFIGURATION OF ADJUSTING PLAN →[(3)-(d)] | RANGE: PLURAL STORAGE NODES FUNCTION: PERFORM ADJUSTING OPERATION (SWITCH/DEGENERATION, SETTING CHANGE) →[(15)-(e)],[(17)-(e)] |
| (10) NODE SERVICE MANAGER | RANGE: SERVER NODE FUNCTION: COLLECT PERFORMANCE INFORMATION OF MIDDLEWARE AND COLLECT LOAD INFORMATION FOR EACH SERVER NODE/ TASK→[(10)-(b)] ※NOTE3 | RANGE: SERVER NODE FUNCTION: ANALYZE PERFORMANCE OF MIDDLEWARE AND ANALYZE STATE OF DISTRIBUTION OF RESOURCES TO TASKS AND EXHAUSTION REDUNDANCY OF RESOURCES(INCLUDING SYMPTOM ANALYSIS) ADJUSTABLE WITH IN NODE→[(9)-(c)] NOT ADJUSTABLE WITH IN NODE→[(2)-(b)] | | | |

NOTE 3: PERFORMANCE INFORMATION MEASURED BY NODE SERVICE MANAGER AND EACH RESOURCE MANAGER IS REPORTED TO UPPER WORKGROUP RESOURCE MANGER FOR MANAGEMENT

FIG. 37B

PERFORMANCE DETERIORATION

| | (a) MONITORING & MEASURING | (b) ANALYSIS | (c) DESIGN | (d) VERIFICATION | (e) OPERATION |
|---|---|---|---|---|---|
| (9) NODE SYSTEM RESOURCE MANAGER | | | RANGE: SERVER NODE FUNCTION: DESIGN RESOURCE ADJUSTMENT (DISTRIBUTION-ADJUSTMENT-TYPE) WITH PLAN→[9]-(d) WITHOUT PLAN→[2]-(b) | RANGE: SERVER NODE FUNCTION: VERIFY ADJUSTING PLAN OK→INSTRUCT FOR OPERATION [(9)-(e)], [(13)-(e)],[(14)-(e)],[(15)-(e)] NG→REDESIGN [(9)-(c)] | RANGE: SOFTWARE ON SERVER NODE FUNCTION: PERFORM ADJUSTING OPERATION (SWITCH/ DEGENERATION, SETTING CHANGE) |
| (13) NODE SERVER RESOURCE MANAGER | RANGE: SERVER RESOURCE ON SERVER NODE (CPU, MEMORY) FUNCTION: MEASURE LOAD STATE FOR EACH SEVER NODE→[(10)-(a)] ※NOTE 3 | | | | RANGE: SERVER RESOURCE ON SERVER NODE (CPU, MEMORY) FUNCTION: PERFORM ADJUSTING OPERATION |
| (14) NODE STORAGE RESOURCE MANAGER | RANGE: STORAGE RESOURCE ON SERVER NODE FUNCTION: MEASURE LOAD STATE FOR EACH SERVER NODE→[(6)-(a)] ※NOTE 3 | | | | RANGE: STORAGE RESOURCE ON SERVER NODE FUNCTION: PERFORM ADJUSTING OPERATION |
| (15) NODE NETWORK RESOURCE MANAGER | RANGE: NETWORK RESOURCE ON SERVER NODE FUNCTION: MEASURE LOAD STATE FOR EACH SERVER NODE→[(7)-(a)] ※NOTE 3 | | | | RANGE: NETWORK RESOURCE ON SERVER NODE FUNCTION: PERFORM ADJUSTING OPERATION |
| (16) STORAGE NODE RESOURCE MANAGER | RANGE: STORAGE NODE (FC-SW, RAID, ETC.) FUNCTION: MEASURE LOAD STATE AND MEASURE USE STATE OF DISK SPACE→[(6)-(a)] ※NOTE 3 | | | | RANGE: STORAGE NODE (FC-SW, RAID, ETC.) FUNCTION: PERFORM ADJUSTING OPERATION |
| (17) NETWORK NODE RESOURCE MANAGER | RANGE: NETWORK NODE (SW, SLB, ECT.) FUNCTION: MEASURE LOAD STATE AND MEASURE USE STATE OF BAND→[(7)-(a)] ※NOTE 3 | | | | RANGE: NETWORK NODE (SW, SLB, ETC.) FUNCTION: PERFORM ADJUSTING OPERATION |

AUTONOMOUS CONTROL APPARATUS, AUTONOMOUS CONTROL METHOD, AND COMPUTER PRODUCT

BACKGROUND OF THE INVENTION

1) Field of the Invention

The present invention relates to a technology for autonomously controlling an information processing system made up of a plurality of information processing apparatuses connected via a network.

2) Description of the Related Art

Conventionally, in an information technology (IT) infrastructure system, resources such as servers, storages, and networks are separately managed. When a failure or an abrupt load change is detected, specifying a failed portion, analyzing a bottleneck, redesigning and verifying the system, and handling are manually carried out based on failure information or load information obtained from each device of the servers, storages, and the networks.

However, as the system becomes larger and the system configuration becomes more complex, the conventional manual handling requires a large amount of time and a large number of process steps when a failure or an abrupt load change occurs, which in turn invites an increase in total cost ownership (TCO) due to the occurrence of trouble caused by an operation mistake or the like.

To cope with the problems, an autonomous control system in which the system is automatically reconfigured at the time of recovering from a failure occurring in the system or at the time of the occurrence of an abrupt load change (see, for example, Japanese Patent Laid-Open Publication No. 2001-265726 and "Server Technology", [searched on Apr. 14, 2004], the Internet URL:http://www.ibm.com/ibm/licensing/patents/server.shtml).

In the autonomous control system, management of resources such as servers, storages, and networks are centralized. By automatically detecting and analyzing a failure or an abrupt load change, reconfiguring and verifying the system, and handling, it is sought to achieve a system that never stops, 24 hours a day, 365 days a year, without manual intervention.

However, in the conventional autonomous control system, there is a problem in which system recovery or reallocation cannot be flexibly performed based on control requirements (policies) of the system. For example, different schemes of system recovery and reallocation are required for different cases where recovery from a failure or handling of a load change is performed as quickly as possible and where the resources are used as effectively as possible. In the conventional autonomous control system, there is a problem in which a recovery or reallocation scheme cannot be changed.

SUMMARY OF THE INVENTION

It is an object of the present invention to solve at least the above problems in the conventional technology.

A computer program according to one aspect of the present invention makes a computer execute reading a policy from a storage unit that stores the policy required for managing an information processing system; and performing an autonomous control based on the policy read.

A computer program according to another aspect of the present invention makes a computer execute reading a policy from a storage unit that stores the policy required for managing an information processing system; and performing a control instruction to each of a plurality of information processing apparatuses connected via a network, based on the policy read.

A computer-readable recording medium according to still another aspect of the present invention stores the computer programs according to the above aspects.

An apparatus for autonomously controlling an information processing system according to still another aspect of the present invention includes a policy storing unit that stores a policy required for managing the information processing system; and a control performing unit that performs an autonomous control based on the policy stored.

An apparatus for autonomously controlling an information processing system according to still another aspect of the present invention includes a policy storing unit that stores a policy required for managing the information processing system; and a control instructing unit that performs a control instruction to each of a plurality of information processing apparatuses connected via a network, based on the policy stored.

A method of autonomously controlling an information processing system according to still another aspect of the present invention includes reading a policy from a storage unit that stores the policy required for managing the information processing system; and performing an autonomous control based on the policy read.

A method of autonomously controlling an information processing system made according to still another aspect of the present invention includes reading a policy from a storage unit that stores the policy required for managing the information processing system; and performing a control instruction to each of a plurality of information processing apparatuses connected via a network, based on the policy read.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 13 is a diagram of an example of a correspondence between physical networks and the model numbers;

FIG. 14 is a diagram of an example of model-number detailed information of the physical networks;

FIG. 15 is a diagram of an example of a correspondence between a physical storage and a model number;

FIG. 16 is a diagram of an example of model-number detailed information of the physical storage;

FIG. 17 is a diagram of an example of a physical resource connecting relationship;

FIG. 18 is a diagram of an example of physical-logical mapping;

FIG. 19 is a diagram of an example of a correspondence between logical servers and types;

FIG. 20 is a diagram of an example of type detailed information of the logical servers;

FIG. 21 is a diagram, of an example of a correspondence between a logical network and a type;

FIG. 22 is a diagram of an example of type detailed information of the logical network;

FIG. 23 is a diagram of an example of a correspondence between a logical storage and a type;

FIG. 24 is a diagram of an example of type detailed information of the logical storage;

FIG. 25 is a diagram of an example of a logical resource connecting relationship;

FIG. 26 is a diagram of an example of a correspondence between logical servers and service layers;

FIG. 27 is a diagram of an example of a correspondence between a logical storage and service layers;

FIG. 28 is a diagram of an example of a correspondence between a logical network and service layers;

FIG. 29 is a diagram of an example of a correspondence between services and resources;

FIG. 30 is a diagram of an example of physical servers registered in a shared pool;

FIG. 36A is a diagram of each function of monitoring & measurement, analysis, design, verification, and operation at failure in the autonomous control system according to the present embodiment (1);

FIG. 36B is a diagram of each function of monitoring & measurement, analysis, design, verification, and operation at failure in the autonomous control system according to the present embodiment (2);

FIG. 37A is a diagram of each function of monitoring & measurement, analysis, design, verification, and operation at performance deterioration in the autonomous control system according to the present embodiment (1);

FIG. 37B is a diagram of each function of monitoring & measurement, analysis, design, verification, and operation at performance deterioration in the autonomous control system according to the present embodiment (2);

DETAILED DESCRIPTION

Exemplary embodiments of an autonomous control apparatus, an autonomous control method, and a computer product according to the present invention are described in detail below with reference to the accompanying drawings.

Figure 1:
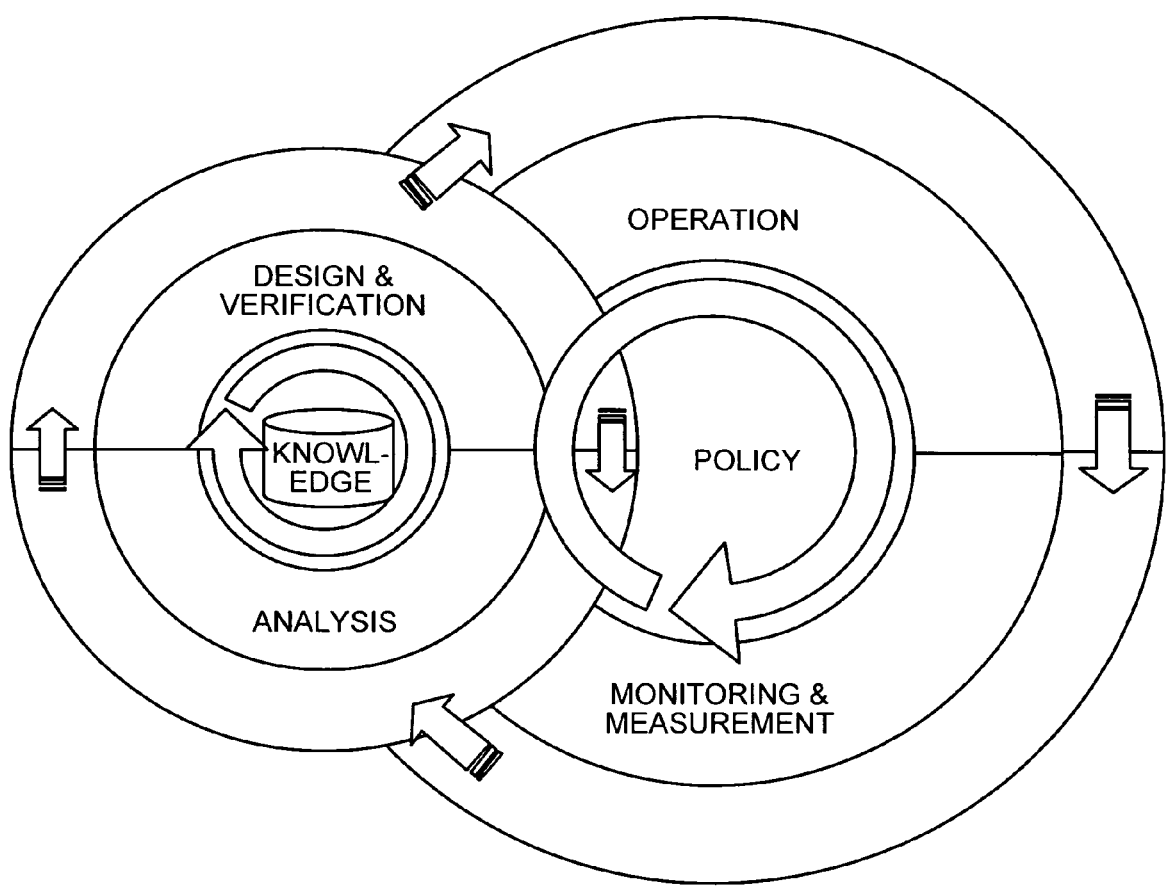
FIG. 1 is an explanatory diagram for explaining a concept of autonomous control loops according to the present embodiment.

FIG. 1 is an explanatory diagram for explaining the concept of the autonomous control loops according to an embodiment of the present invention. An autonomous control according to the present embodiment includes two loops: a loop of "monitoring & measurement" and "operation"; and a loop of "analysis" and "design & verification", for performing respective phases based on control requirements (policies) and knowledge databases.

In the "monitoring & measurement" phase, an operation state, such as a failure, is monitored and a load state is measured. If instantaneous handling is possible with a predefined procedure, a handling scheme and a request for performing the handling scheme are provided to the "operation" phase. On the other hand, if instantaneous handling is not possible, failure information and load information are reported to the "analysis" phase.

In the "analysis" phase, the detected failed portion and a range influenced thereby are specified and analyzed. Also, a bottleneck and influences to others are specified and analyzed. Then, an amount of required resources is calculated.

In the "design & verification" phase, based on the analysis results and policies, allocation of the resources is adjusted. For example, a design is made so as to make a suggestion for improvement in reallocation of the resources by obtaining a required resource from the resource pool shared in the system. Then, the system configuration according to the suggestion of improvement is verified. If the verification results prove no problem, a design is made so as to incorporate the new resource and also to change the setting of peripheral resources.

In the "operation" phase, based on a predefined procedure and design and verification results, the resources are reconfigured.

In this manner, in the autonomous control system according to the present embodiment, allocation of the resources is adjusted based on the control requirements (policies), thereby achieving a flexible autonomous control system.

Figure 2:
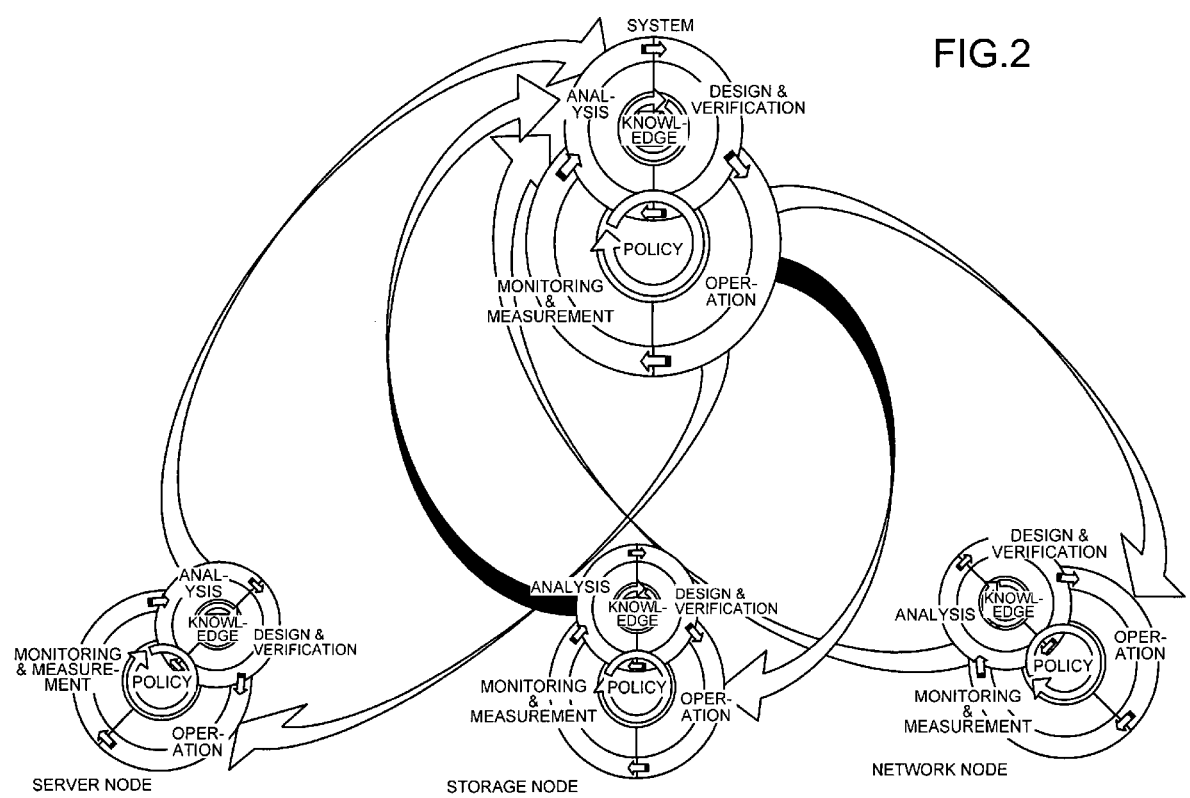
FIG. 2 is a diagram of a correlation in the autonomous control loops according to the present embodiment.

FIG. 2 is a diagram of a correlation in the autonomous control loops according to the present embodiment. In the autonomous control according to the present embodiment, an autonomous control loop functions at each of server, storage, network nodes, and also functions over a plurality of nodes. That is, at each node, an autonomous control loop functions for the resources at each node. This autonomous control loop also functions for autonomously controlling the resources over the plurality of nodes in the entire system for purposes including operation and management.

Figure 3:
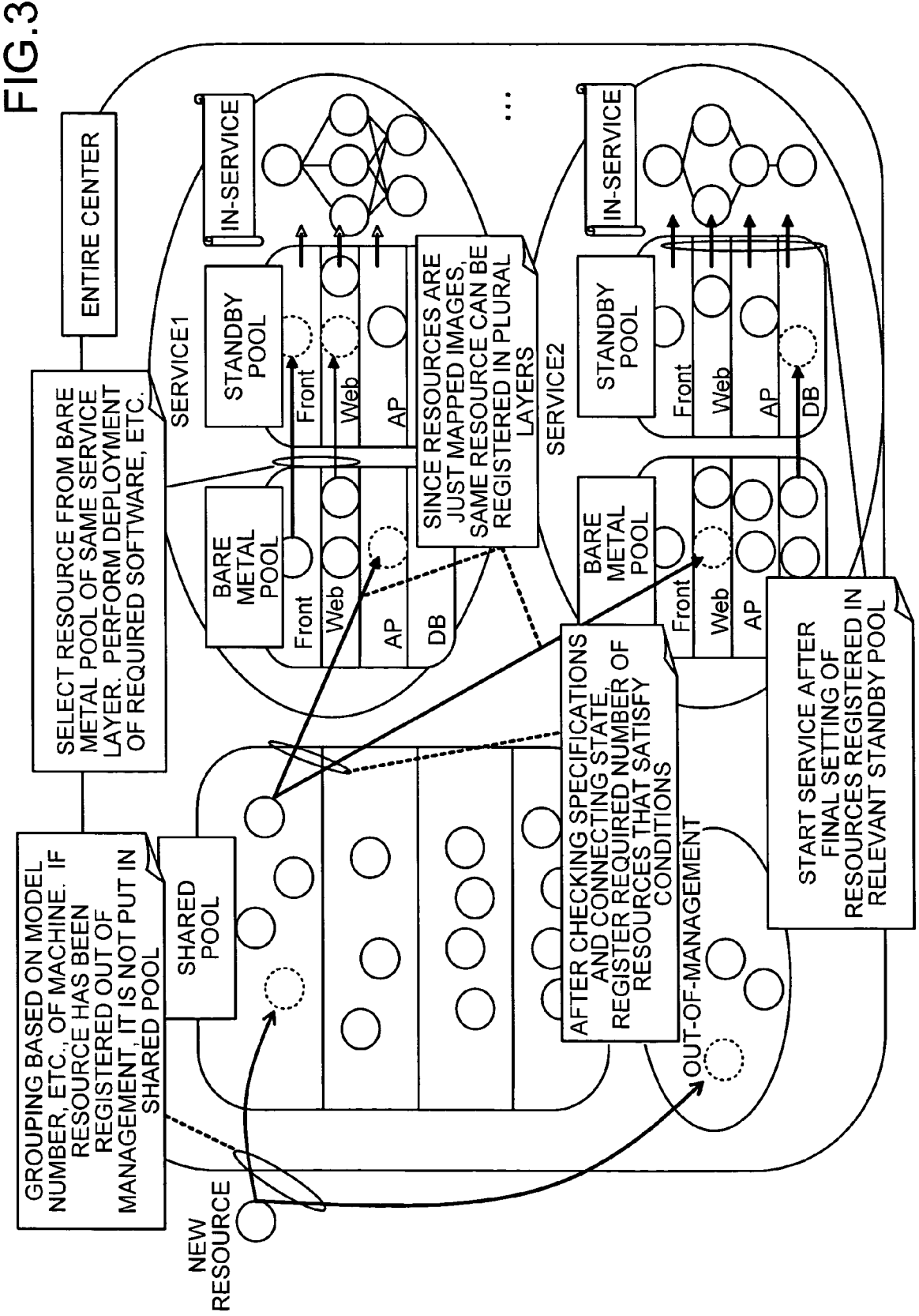
FIG. 3 is an explanatory diagram for explaining a concept of a resource pool in the autonomous control according to the present embodiment.

FIG. 3 is an explanatory diagram for explaining a concept of a resource pool in the autonomous control according to the present embodiment. In the autonomous control according to the present embodiment, as a means for adjusting allocation of the resources, an auxiliary device or an auxiliary component for the server/storage/network is provided as a resource pool shared in the system. As required, a resource is allocated from or returned to this resource pool, thereby adjusting the allocation of the resources.

Here, for a server pool, the server body for performing a calculating process is a pool itself. At the time of server selection, a performance specification is a main index. For a storage pool, its important role is to allocate capacity and links connected thereto, as well as the performance. In a network pool, bandwidths and links have to be allocated.

In any of the pools, in consideration of the effective use of the resources and the quickness of a response, a practically-applicable function of adjusting the allocation cannot be provided unless a plurality of pools are provided according to the states of the resources and the connecting states. Therefore, in the present autonomous control system, pools in three tiers, that is, a "shared pool", a "bare metal pool", and a "standby pool", are taken as forming a basic configuration to achieve the allocation adjusting function.

The "shared pool" is a pool shared in the entire system for retaining all idle resources classified by model number or the like. A newly-introduced resource is first put into this pool. In this pool, physical resources are managed by housing (for blade servers, each CPU blade is handled as one housing).

The resources in this pool can be used from any services (as long as use conditions are satisfied), and therefore are optimal in view of effective use of the resources. However, deployment (preparation such as installing required software) and various setting from the beginning are required before incorporation in a service for use, thereby requiring a large amount of time before the service is started.

The "bare metal pool" is a pool dedicated to each service layer, and has registered therein a resource selected as suitable for the service layer. The service model according to the present embodiment includes four service layers, that is, a Front layer, a Web layer, an AP layer, and a DB layer, and is described in detail further below.

Registering in the bare metal pool means registering a map of a resource retained in the shared pool in the service layer, and the substance of the resource is still registered in the shared pool. Also, the "suitable" resource herein is a resource satisfying a required hardware standard and also having an appropriate physical wiring provided thereto.

In this stage, the same resource may be registered in a plurality of bare metal pools, that is, a plurality of service layers (the same resources is allowed to belong to a plurality of services). Since it has already been verified that the resources in this pool are available in the service layer, a time required until the service is started is slightly shorter compared with the case where a resource is selected from the shared pool.

The verification time increases in proportion to the size of the resources provided. Therefore, it is more efficient to provide a bare metal pool as the size of the resources increases. As for resource sharing, as described above, the bare metal pool is merely a map of the shared pool, and therefore has flexibility as much as that of the shared pool.

The "standby pool" is a pool dedicated to each service layer for retaining resources that have been deployed from the resources registered in the bare metal pool of the service layer and immediately made available. Each of the resources belonging to the standby pool is included in at least one service layer.

The resources in this pool can start the service with minimum-required setting, and therefore can make a response upon request quickest of the three. However, these resources are strictly dedicated to the service layer, and therefore it is not efficient to retain too many resources in the standby pool.

As such, in the autonomous control system according to the present embodiment, three resource pools with different preparation states for the services are provided, thereby providing a flexible allocation adjusting function.

Figure 4:
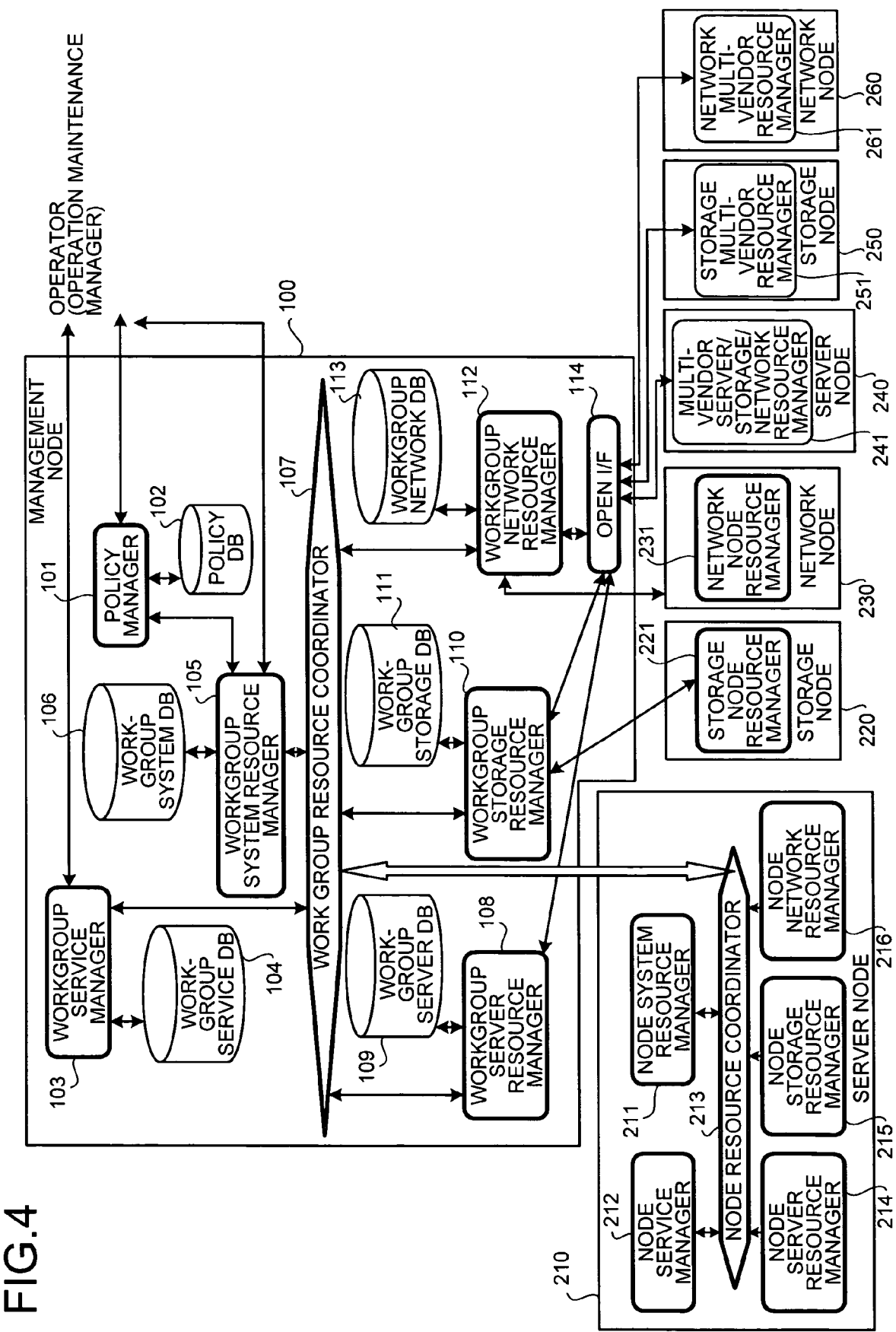
FIG. 4 is a functional block diagram of the system configuration of an autonomous control system according to the present embodiment.

FIG. 4 is a functional block diagram of the system configuration of the autonomous control system according to the present embodiment. As shown in the drawing, this autonomous control system includes a management node 100, server nodes 210 and 240, storage nodes 220 and 250, and network nodes 230 and 260. These nodes are connected to one another via a network.

Here, for convenience of description, two server nodes, storage nodes, and network nodes are shown. This autonomous control system includes an arbitrary number of server nodes, storage nodes, and network nodes.

The management node 100 is hardware having incorporated therein software for the purpose of managing and controlling the entire system including the server nodes 210 and 240, the storage nodes 220 and 250, and the network nodes 230 and 260.

The server node 210 is hardware having incorporated therein software for the purpose of managing and controlling server resources in a single server device (by OS instance). Here, the server resources are physical resources, such as a CPU, memory, disk, HBA (Host Bus Adaptor) in node, and NIC (Network Interface Card), and software operating on the server device (managed by a node server resource manager 214).

The storage node 220 is hardware having incorporated therein software for the purpose of managing and controlling storage resources in a single storage device. Here, the storage resources are storage-related logical resources in the server node 210 (they are managed by a node storage resource manager 215), such as those for managing DB table information in the server node 210, and storage devices (managed by the storage node resource manager 221), such as a storage area network (SAN) and a network attached storage (NAS).

The network node 230 is hardware having incorporated therein software for the purpose of managing and controlling network resources in a single network device. Here, the network resources are network-related logical resources in the server node 210 (they are managed by a node network resource manager 216) and network devices (managed by a network node resource manager 231), such as a router, switch, firewall, and load balancer.

The server node 240 is similar to the server node 210, that is, hardware having incorporated therein software for the purpose of managing and controlling server resources in a single server device, but its vendor is different from that of the server node 210.

The storage node 250 is similar to the storage node 220, that is, hardware having incorporated therein software for the purpose of managing and controlling storage resources in a single storage device, but its vendor is different from that of the storage node 220.

The network node 260 is similar to the network node 230, that is, hardware having incorporated therein software for the purpose of managing and controlling network resources in a single network device, but its vendor is different from that of the network node 230.

The software incorporated in the management node 100 includes a policy manager 101, a policy DB 102, a workgroup service manager 103, a workgroup service DB 104, a workgroup system resource manager 105, a workgroup system DB 106, a workgroup resource coordinator 107, a workgroup server resource manager 108, a workgroup server DB 109, a workgroup storage resource manager 110, a workgroup storage DB 111, a workgroup network resource manager 112, a workgroup network DB 113, and an open I/F 114.

The policy manager 101 is a processing unit that manages the entire policies handled by the autonomous control system. In conjunction with a policy managing function of each block (manager), the policy manager 101 unifies respective policy setting views and breaks down the policies into those to be handled by each block.

The policy DB 102 is a database having stored therein the policies managed by the policy manager 101. The policies of each block are stored in a database managed by each block.

The workgroup service manager 103 is a processing unit that manages the configuration of the service, measures the performance, and carries out an analysis (including a symptom analysis) over the entire system. The workgroup service DB 104 is a database having stored therein data, such as policies to be used by the workgroup service manager 103.

The workgroup system resource manager 105 is a processing unit that manages the configuration of the resources and carries out monitoring and analysis of a failure, and design, verification and operation over the entire system and, when the situation cannot be handled in the system, reports as such to an operator.

The workgroup system DB 106 is a database having stored therein data to be used by the workgroup system resource manager 105. Details of this database will be described further below.

The workgroup resource coordinator 107 is a processing unit that operates as an interface <pipe> between each node resource manager of the system/server/storage/network and each workgroup resource manager of the system/server/storage/network. That is, the workgroup resource coordinator 107 serves as an infrastructure for data communications between node resource managers and the workgroup resource managers to ensure consistency between data inputs and outputs of the resource coordinator.

The workgroup server resource manager 108 is a processing unit that manages the configuration of the server resources and carries out monitoring and analysis of a failure, and verification and operation over the entire server nodes under the control of the management node 100. The workgroup server DB 109 is a database having stored therein data, such as policies to be used by the workgroup server resource manager 108.

The workgroup storage resource manager 110 is a processing unit that manages the configuration of the storage resources and carries out monitoring and measurement of a failure and performance, and analysis, verification and operation in the storage resources in all storage nodes and the server node under the control of the management node 100. The workgroup storage DB 111 is a database having stored therein data, such as policies to be used by the workgroup storage resource manager 110.

The workgroup network resource manager 112 is a processing unit that manages the configuration of the network resources and carries out monitoring, measurement, and analysis of a failure and performance, and verification and operation in the network resources in all network nodes and the server node under the control of the management node 100. The workgroup network DB 113 is a database having stored therein data, such as policies to be used by the workgroup network resource manager 112.

The open I/F 114 is a processing unit that operates as a gateway for devices (devices of different vendors) provided with an open interface. The management node 100 communicates via this open I/F 114 with the server node 240, the storage node 250, and the network node 260 of the different vendors.

The software incorporated in the server node 210 includes a node system resource manager 211, a node service manager 212, a node resource coordinator 213, a node server resource manager 214, a node storage resource manager 215, and a node network resource manager 216.

The node system resource manager 211 is a processing unit that manages the configuration of the resources and carries out monitoring and analysis of a failure, and design, verification and operation in the server node 210. Also, when analyzing a failure to find that the failure cannot be overcome within the server node 210, the node system resource manager 211 requests the workgroup system resource manager 105 to overcome the failure.

The node service manager 212 is a processing unit that manages the configuration of tasks and carries out monitoring and analysis of a failure, and measurement and analysis of the performance in the server node 210. Also, when a failure cannot be overcome within the server node 210, the node service manager 212 requests the workgroup service manager 103 to overcome the failure.

The node resource coordinator 213 is a processing unit that operates as an interface <pipe> between each node resource manager of the system/server/storage/network and each workgroup resource manager of the system/server/storage/network. That is, the node resource coordinator 213 serves as an infrastructure for data communications between node resource managers and the workgroup resource managers to ensure consistency between data inputs and outputs of the resource coordinator.

The node server resource manager 214 is a processing unit that manages the configuration of the server resources and carries out monitoring and measurement of a failure and performance, and operation in the server node 210.

The node storage resource manager 215 is a processing unit that manages the configuration of the storage resources and carries out monitoring and measurement of a failure and performance, and operation in the server node 210.

The node network resource manager 216 is a processing unit that manages the configuration of the network resources and carries out monitoring and measurement of a failure and the performance, and operation in the server node 210.

The software incorporated in the storage node 220 includes a storage node resource manager 221. The storage node resource manager 221 is a processing unit that manages the configuration of the storage resources and carries out monitoring, analysis, design and verification at a failure, and measurement and operation with the performance in the storage node 220. Also, when analyzing a failure to find that the failure cannot be overcome within the storage node 220, the storage node resource manager 221 requests the workgroup storage resource manager 110 to overcome the failure.

The software incorporated in the network node 230 includes a network node resource manager 231. The network node resource manager 231 is a processing unit that manages the configuration of the network resources and carries out monitoring, analysis, design and verification at a failure, and measurement and operation with the performance in the network node 230. Also, when analyzing a failure to find that the failure cannot be overcome within the network node 230, the network node resource manager 231 requests the workgroup network resource manager 112 to overcome the failure.

The software incorporated in the server node 240 includes multi-vendor server/storage/network resource managers 241 to 243. The multi-vendor server/storage/network resource managers 241 to 243 are processing units that manage the configuration of the server resources/storage resources/network resources and carries out monitoring and measurement at a failure with the performance, and operation in the server node 240.

The software incorporated in the storage node 250 includes a storage multi-vendor resource manager 251. The storage multi-vendor resource manager 251 is a processing unit that manages the configuration of the storage resources and carries out monitoring, analysis, design and verification at a failure, measurement with the performance, and operation in the storage node 250. Also, when analyzing a failure to find that the failure cannot be overcome within the storage node 250, the storage multi-vendor resource manager 251 requests the workgroup storage resource manager 110 to overcome the failure.

The software incorporated in the network node 260 includes a network multi-vendor resource manager 261. The network multi-vendor resource manager 261 is a processing unit that manages the configuration of the network resources and carries out monitoring, analysis, design and verification at a failure, measurement with the performance, and operation in the network node 260. Also, when analyzing a failure to find that the failure cannot be overcome within the network node 260, the network multi-vendor resource manager 261 requests the workgroup network resource manager 112 to overcome the failure.

In FIG. 4, the case is shown where the management node 100, the server node 210, the storage node 220, the network node 230, and others are connected to one another via the network. Alternatively, the software incorporated in the management node 100 and the software incorporated in the server node 210 may be incorporated in the same computer system, or the software incorporated in the management node 100 may be distributed in a plurality of computer systems.

Figure 5:
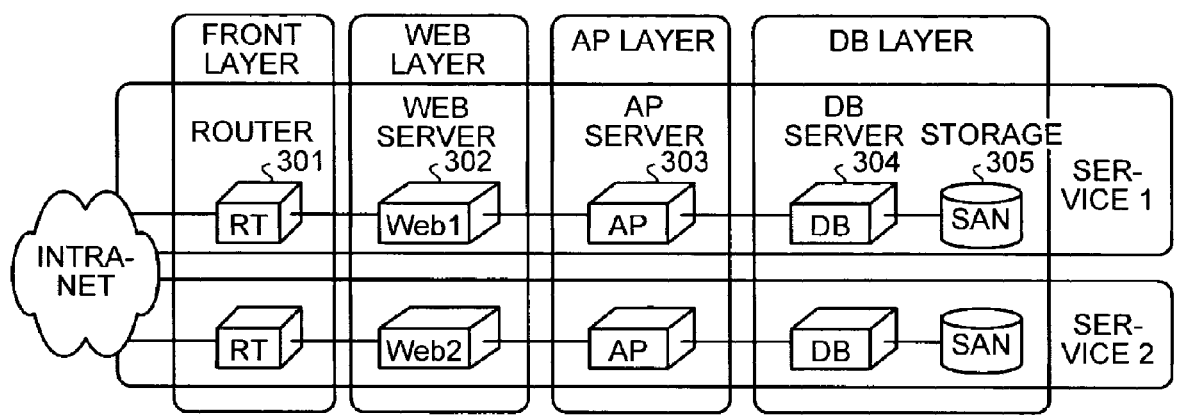
FIG. 5 is a diagram of a service model configuration of the autonomous control system according to the present embodiment.
Figure 6:
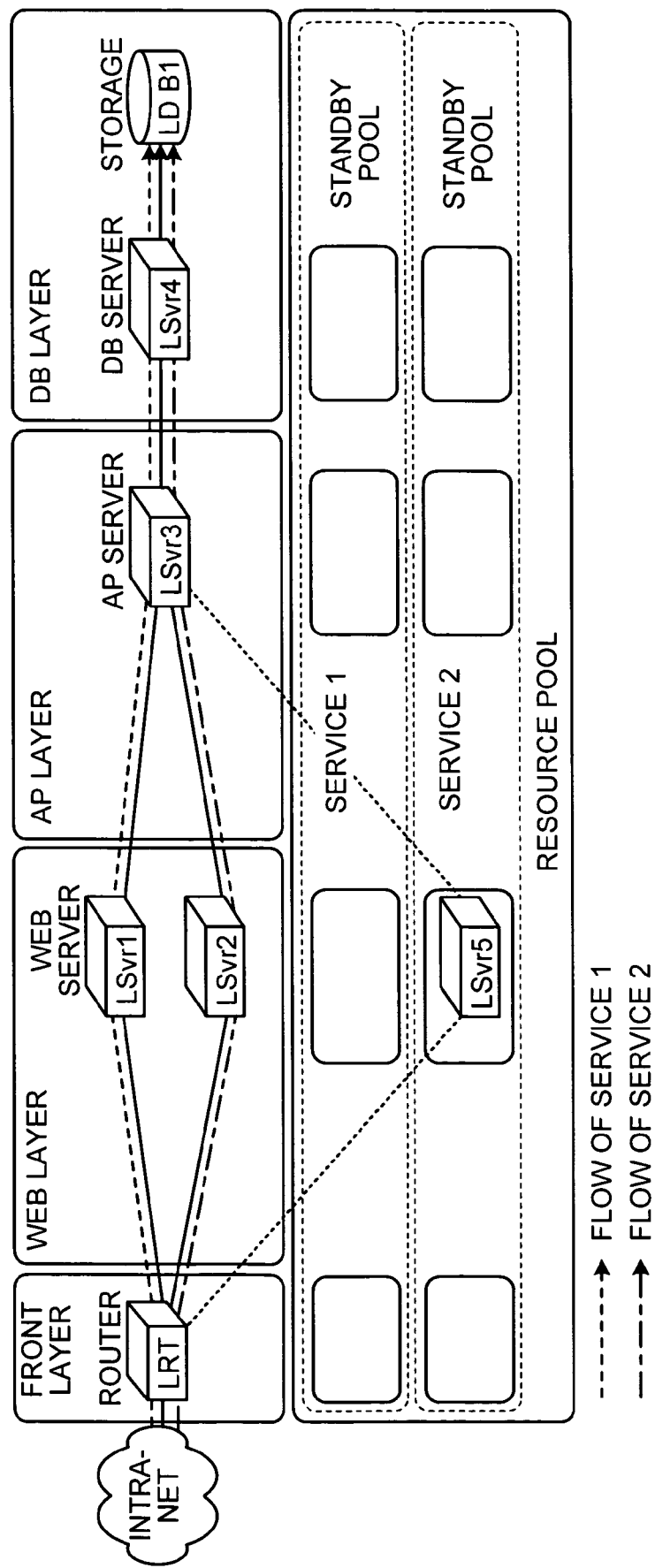
FIG. 6 is a diagram of a logical configuration of the autonomous control system according to the present embodiment.
Figure 7:
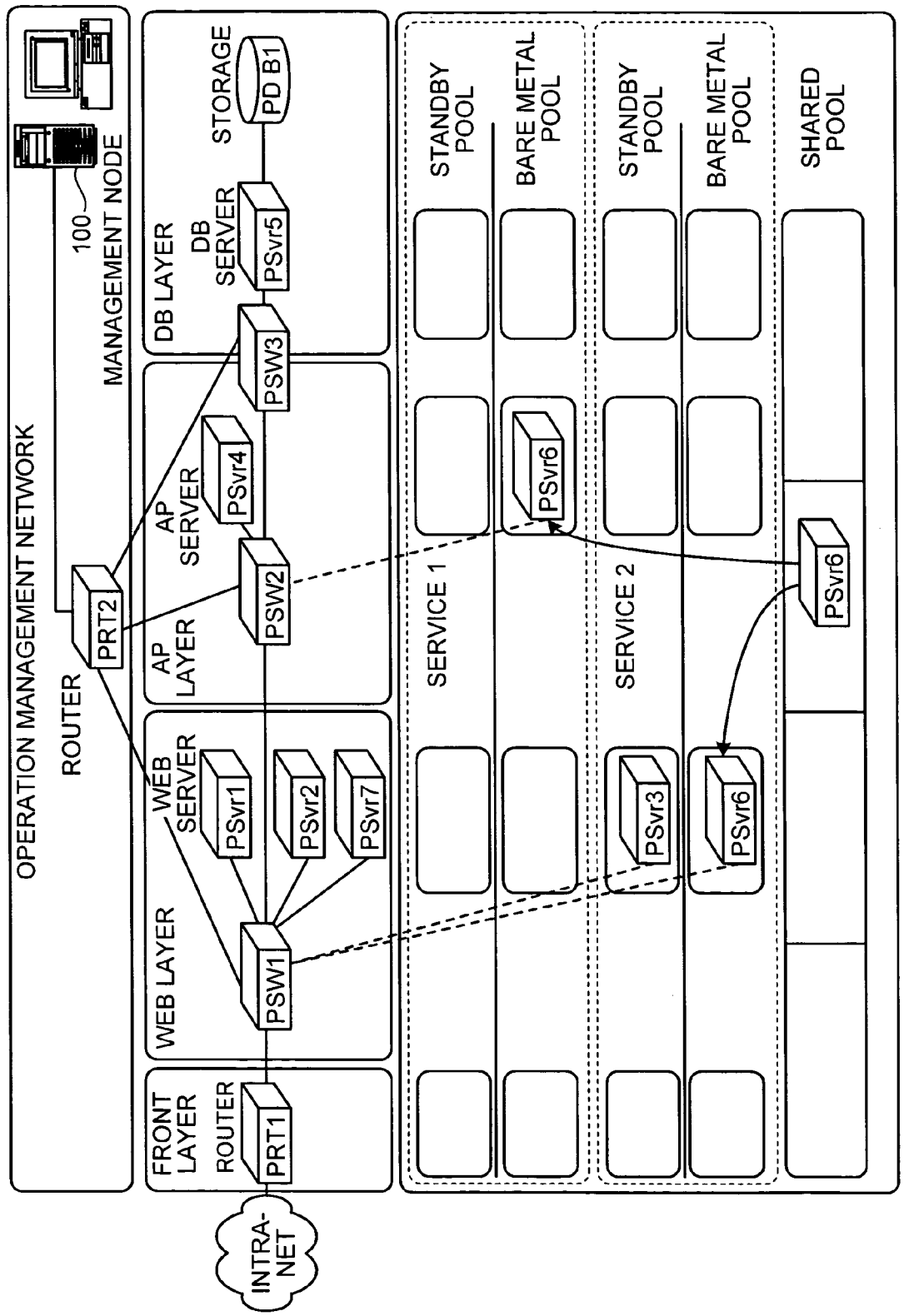
FIG. 7 is a diagram of a physical configuration of the autonomous control system according to the present embodiment.

Next, the service mode, the logical configuration, and the physical configuration of the autonomous control system according to the present embodiment are described by using FIGS. 5 to 7. FIG. 5 is a diagram of a service model configuration of the autonomous control system according to the present embodiment. Here, the service is a series of tasks to be provided to end users.

As shown in FIG. 5, the autonomous control system according to the present embodiment, a service model of four layers, that is, the Front layer, the Web layer, the AP layer, and the DB layer, is taken as a reference. The Front layer is a layer for connecting the Internet and an intranet. In this Front layer, a router 301 and a firewall for the entire center are disposed.

The Web layer is a layer in which a Web server 302 and a directory server are disposed. While the Front layer is an exit and entrance of the center, the Web layer corresponds to an exit and entrance of the service. The AP layer is a layer in which an AP server 303 for processing a business logic portion of the service is disposed, and the DB layer is a layer in which a DB server 304 and a storage 305 that take charge of database processing are disposed.

As such, the service is divided into four hierarchical layers, and physical resources suitable for the processing contents are allocated to each hierarchical layer as many as required, thereby efficiently performing the service and also allowing optimal resource operation in the entire center.

The router 301 corresponds to the network node 230 shown in FIG. 4. The Web server 302, the AP server 303, and the DB server 304 correspond to the server node 210 shown in FIG. 4. The storage 305 corresponds to the storage node 220 shown in FIG. 4.

FIG. 6 is a diagram of a logical configuration of the autonomous control system according to the present embodiment. As shown in the drawing, the Front layer has disposed therein a logical network (router) "LRT1", the Web layer has disposed therein logical servers "LSvr1" and "LSvr2", the AP layer has disposed therein a logical server "LSvr3", and the DB layer has disposed therein a logical server "LSvr4" and a logical storage (database) "LDB1".

Then, a "service 1" is provided by a logical network "LRT1", the logical server "LSvr1", the logical server "LSvr3", the logical server "LSvr4", and the logical storage "LDB1", while a "service 2" is provided by a logical network "LRT1", the logical server "LSvr2", the logical server "LSvr3", the logical server "LSvr4", and the logical storage "LDB1". Also, the standby pool of the Web layer for the "service 2" has registered therein a logical server "LSvr5".

This logical system is a virtual layer provided between the service and the physical system for allowing a flexible resource operation so that a change in configuration of the physical resources does not directly influence the service. The logical servers, the logical storage, and the logical network are generally referred to as logical resources.

FIG. 7 is a diagram of a physical configuration of the autonomous control system according to the present embodiment. As shown in the drawing, in the autonomous control system according to the present embodiment, the Front layer has disposed therein a physical network (router) "PRT1", the Web layer has disposed therein a physical network (switch) "PSW1" and physical servers "PSvr1", "PSvr2", and "PSvr7", the AP layer has disposed therein a physical network "PSW2" and a physical server "PSvr4", and the DB layer has disposed therein a physical network "PSW3", a physical server "PSvr5", and a physical storage (database) "PDB1". Also, the physical networks "PSW1", "PSW2", and "PSW3" are connected to the management node 100 via a physical network "PRT2".

Also, the bare metal pool of the AP layer for the "service 1" has registered therein a physical server "PSvr6", the standby pool of the AP layer for the "service 2" has registered therein a physical server "PSvr3", and the bare metal pool for the "service 2" has registered therein the physical server "PSvr6". The physical server "PSvr6" is also registered in the shared pool. Also, the physical servers, the physical storage, and the physical networks are generally referred to as physical resources.

Figure 8:
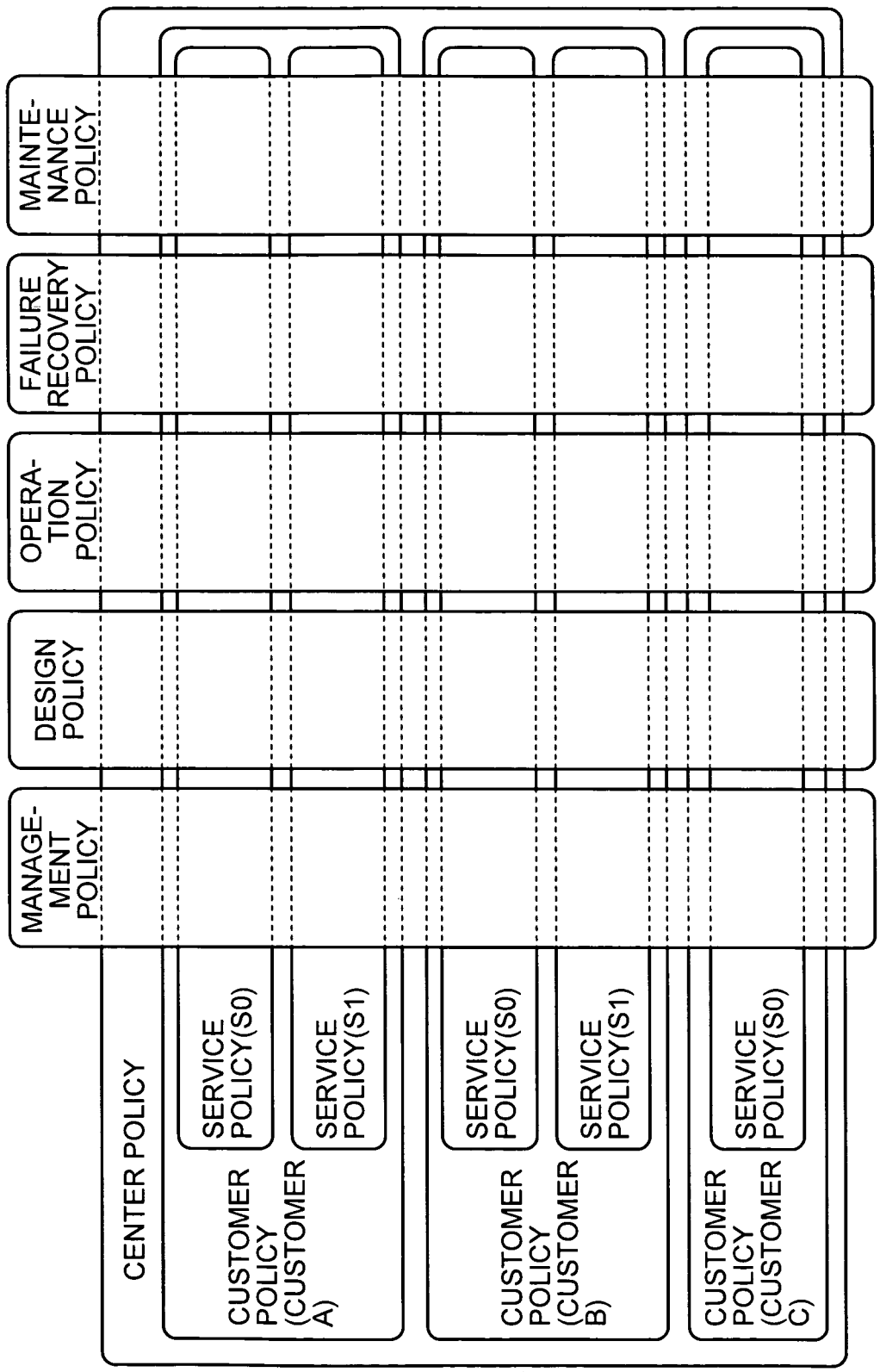
FIG. 8 is a diagram of the entire image of policies.
Figure 9:
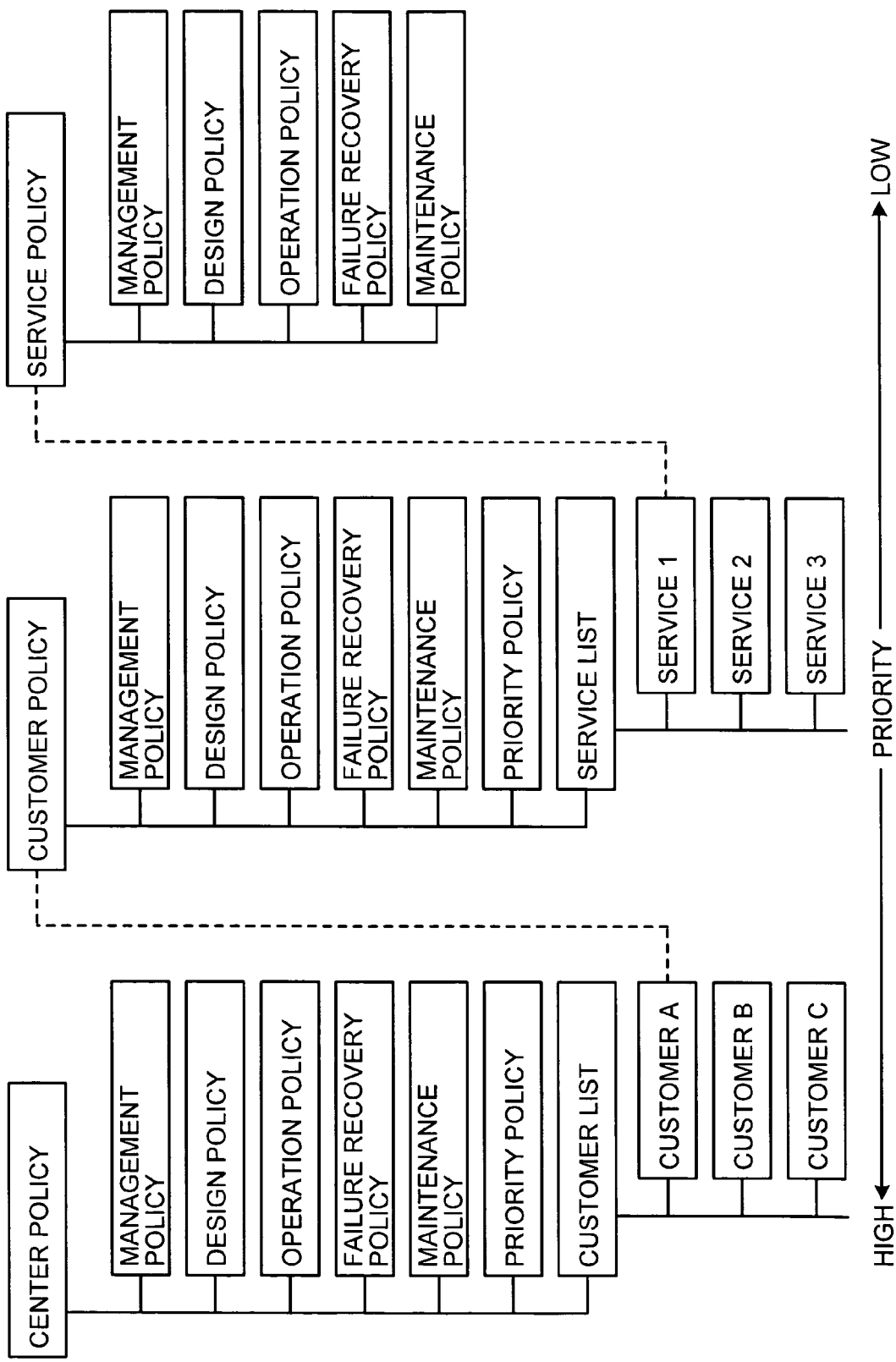
FIG. 9 is a diagram of the entire configuration of the policies.

FIG. 8 is a diagram of the entire image of the policies. FIG. 9 is a diagram of the entire configuration of the policies. As shown in FIGS. 8 and 9, the policies include a center policy, customer policies, and service policies.

The center policy is a policy for the entire center. The customer policies are policies for the respective customers. The service policies are policies for the respective services for each customer. The center policy has the highest priority, while the service policy has the lowest priority.

Also, each of the center policy, the customer policies, and the service policies includes a management policy, a design policy, an operation policy, a failure recovery policy, and a maintenance policy.

Figures 10, 11, 12:
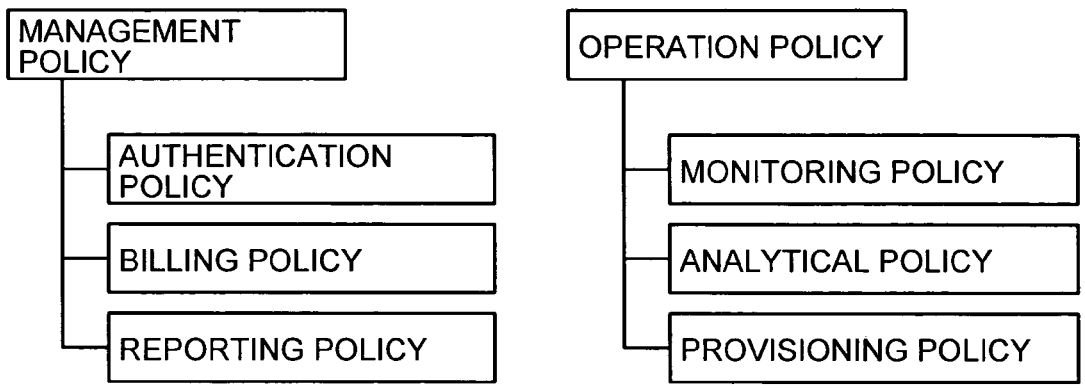
FIG. 10 is a diagram of details of the policies.
FIG. 11 is a diagram of an example of a correspondence between physical servers and model numbers.
FIG. 12 is a diagram of an example of model-number detailed information of the physical servers.
Figure 31A:
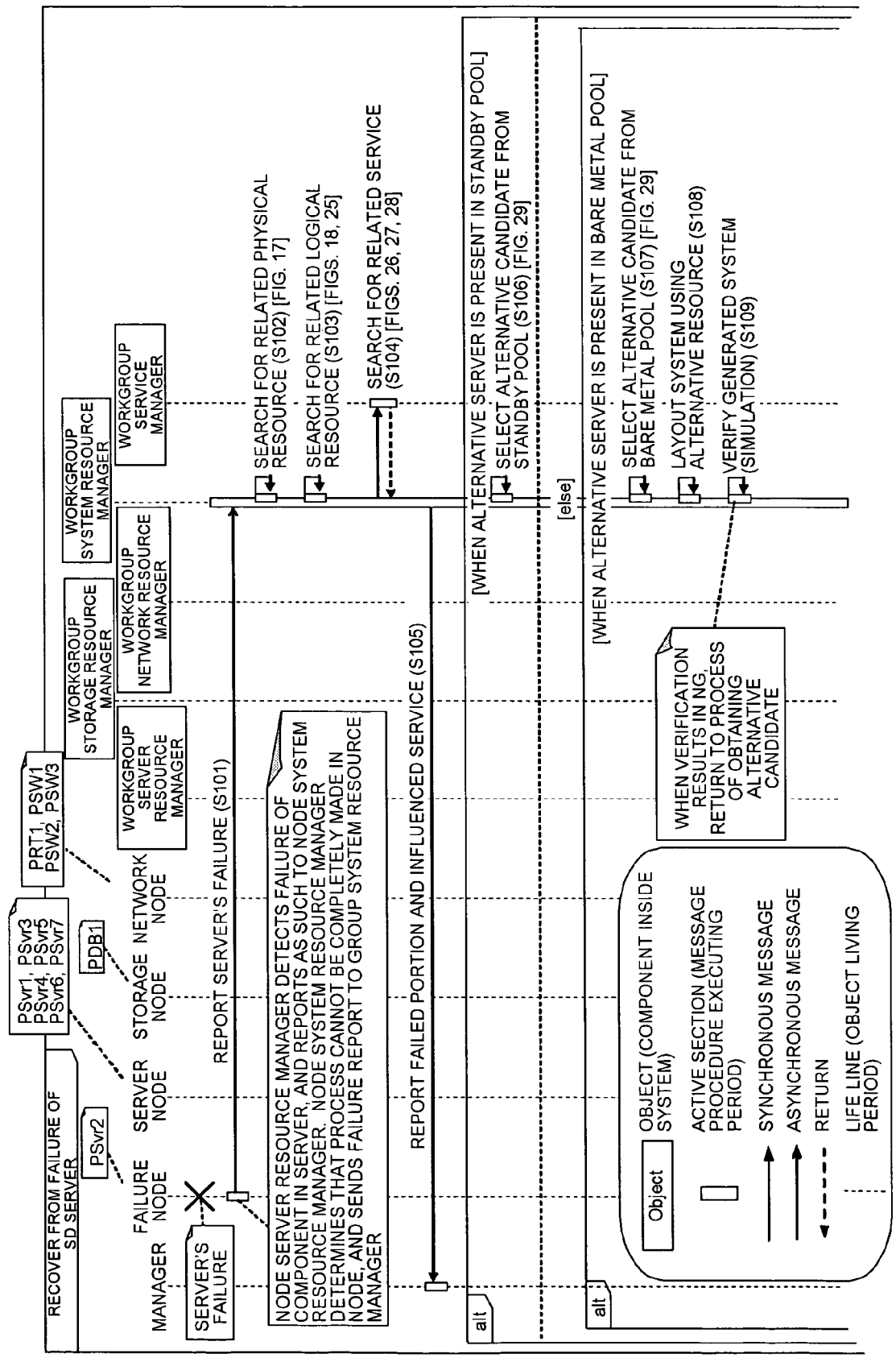
FIG. 31A is a sequence diagram of a procedure of recovering from a server failure (1)
Figure 31B:
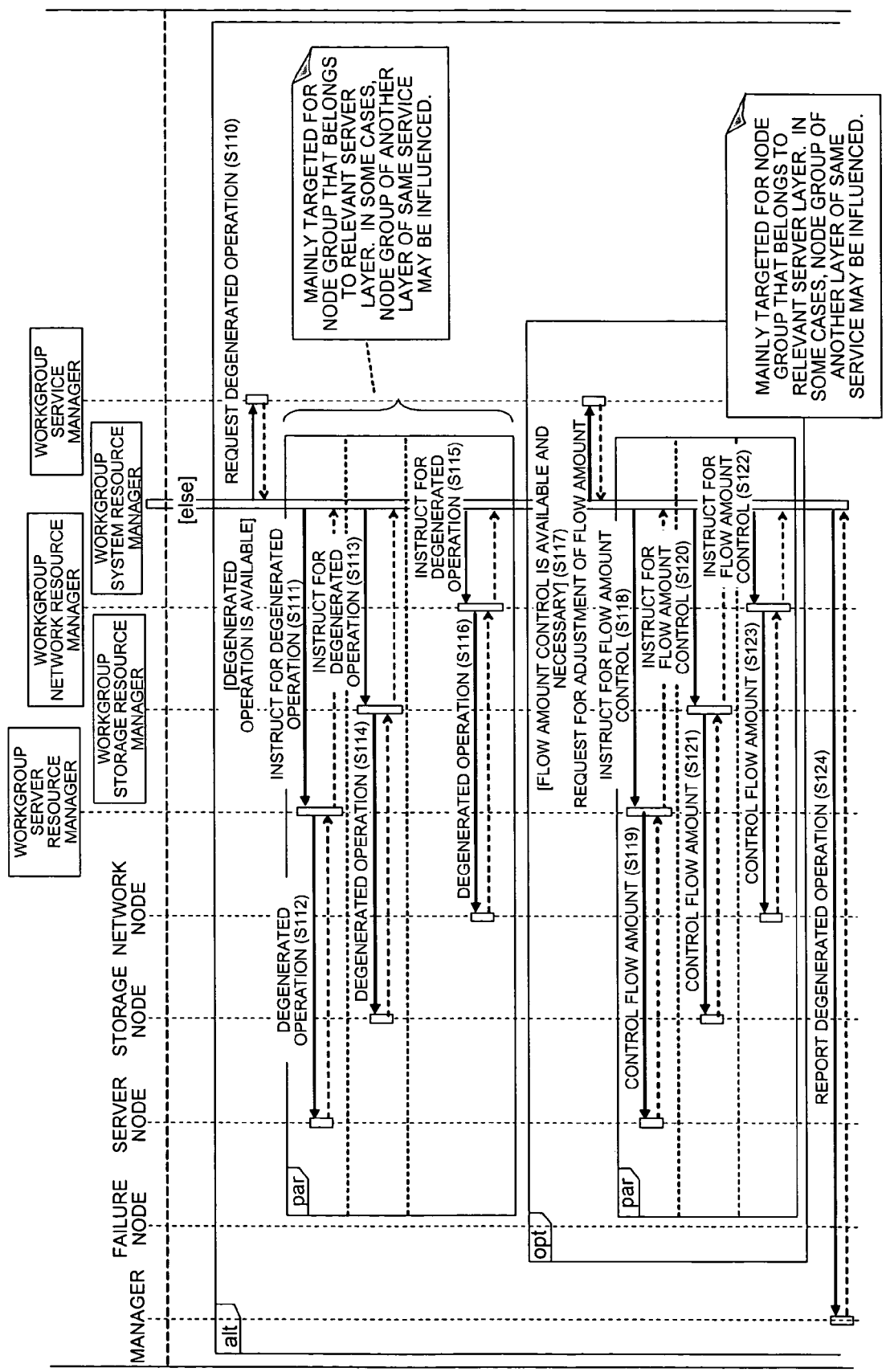
FIG. 31B is a sequence diagram of a procedure of recovering from a server failure (2)
Figure 31C:
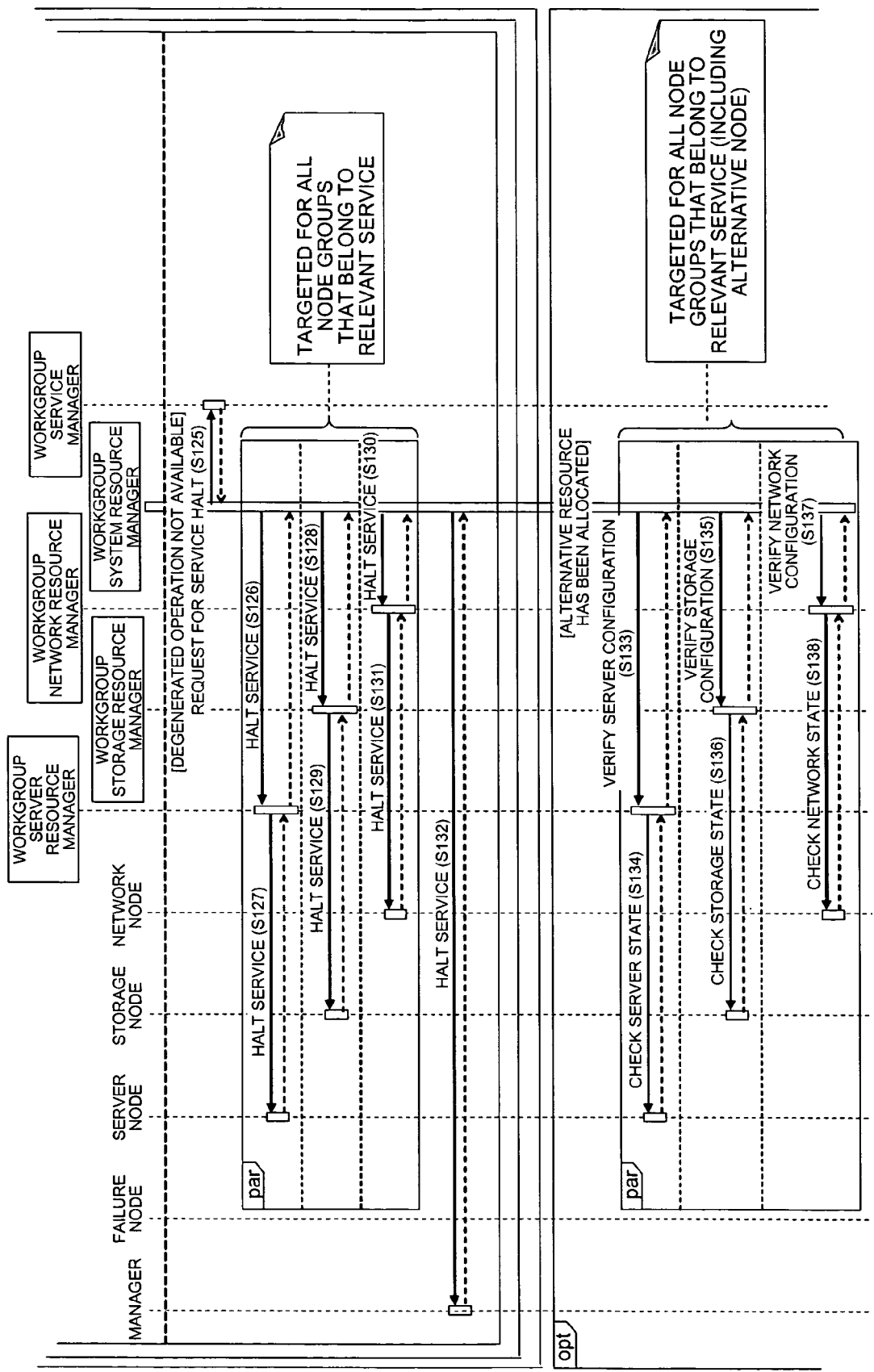
FIG. 31C is a sequence diagram of a procedure of recovering from a server failure (3)
Figure 31D:
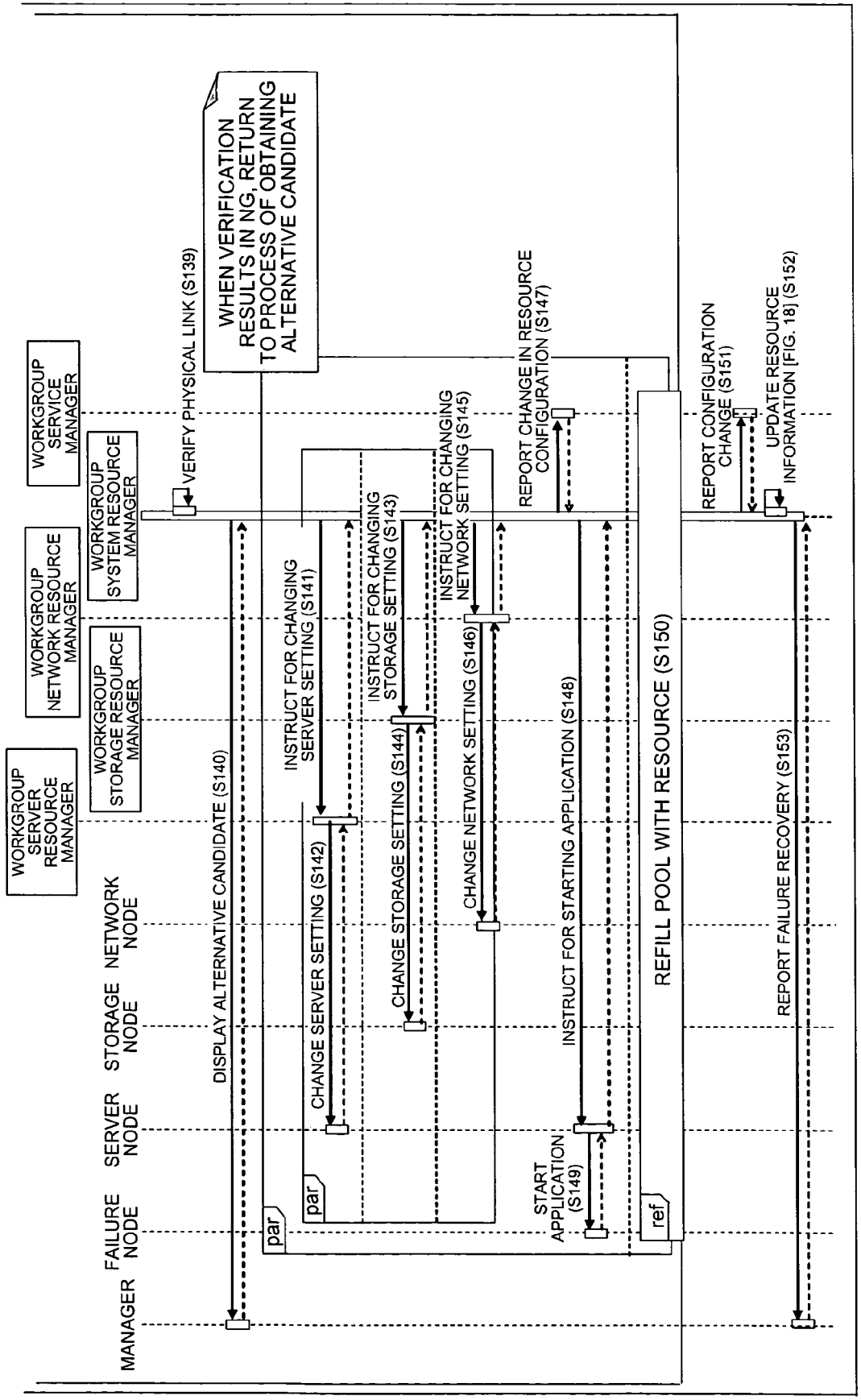
FIG. 31D is a sequence diagram of a procedure of recovering from a server failure (4)
Figure 32A:
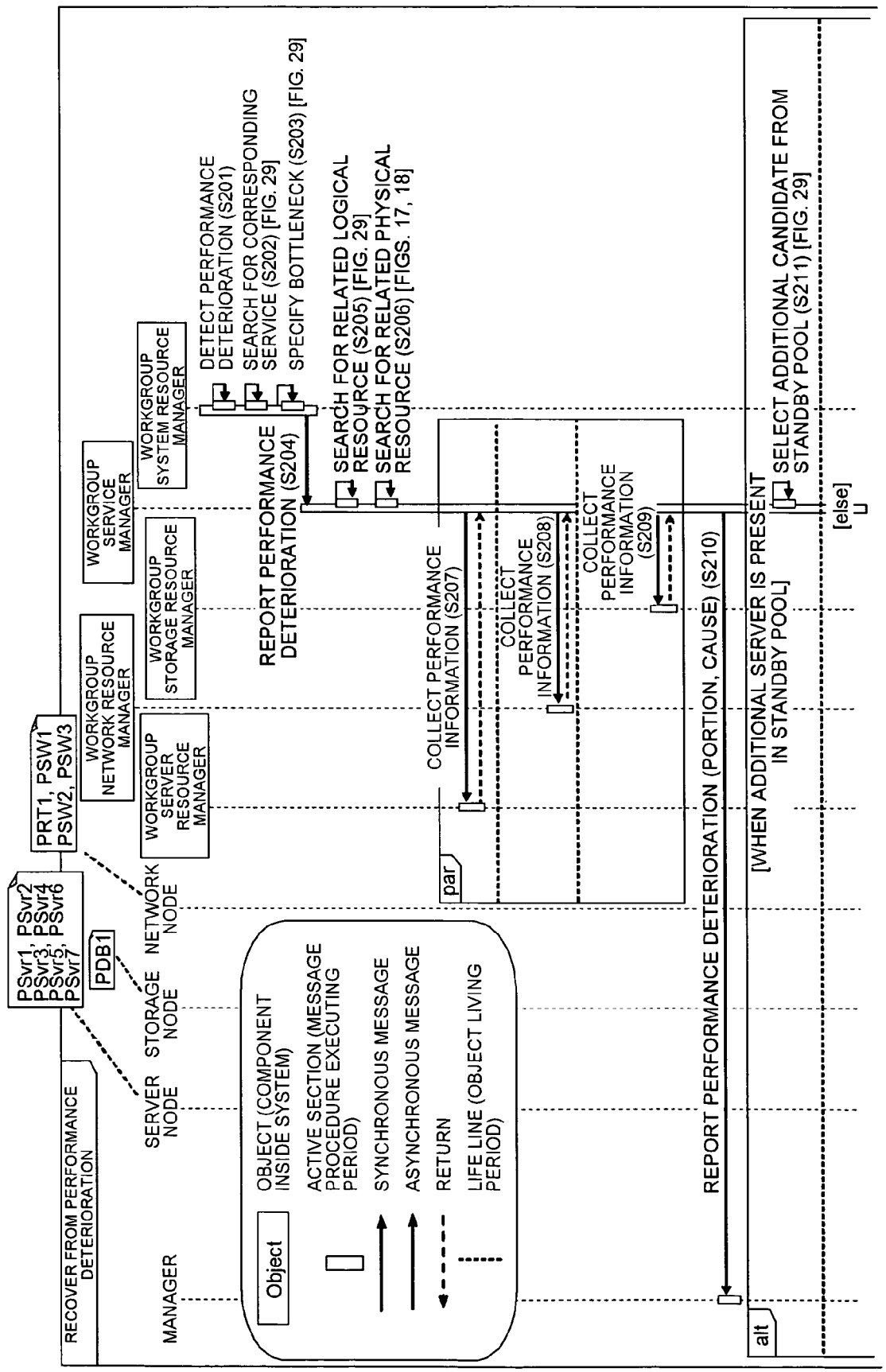
FIG. 32A is a sequence diagram of a procedure of recovering from performance deterioration (1)
Figure 32B:
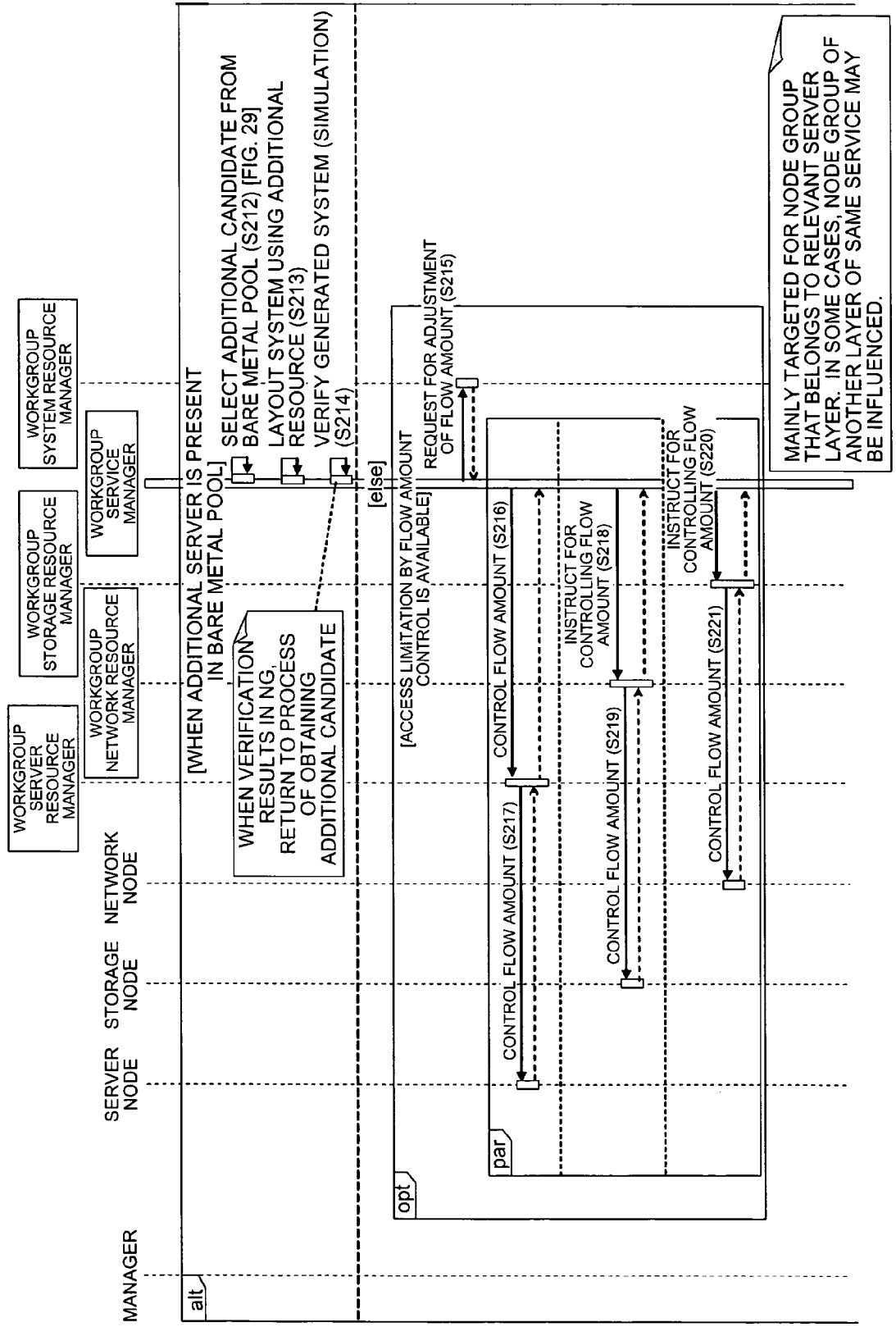
FIG. 32B is a sequence diagram of a procedure of recovering from performance deterioration (2)
Figure 32C:
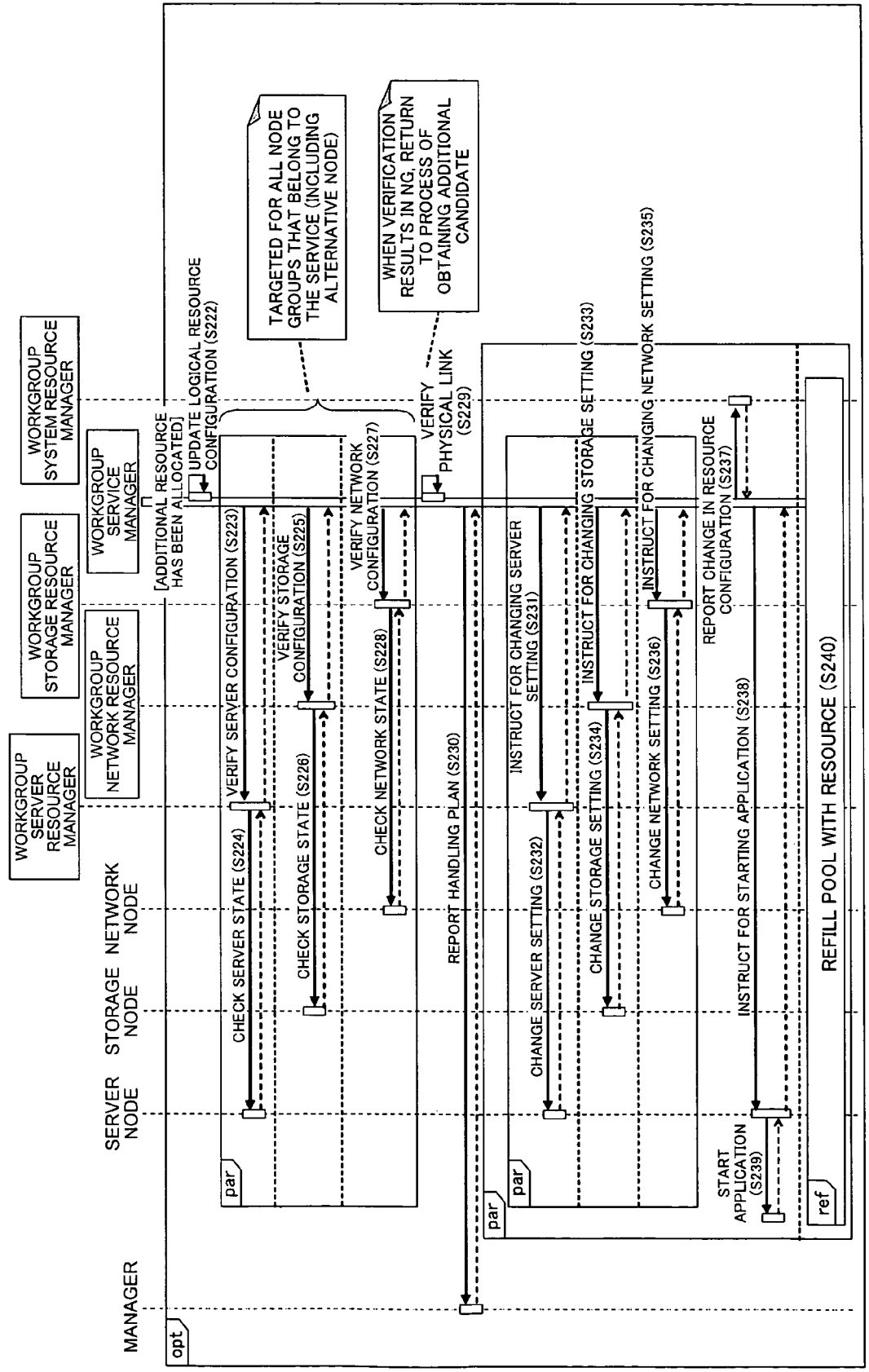
FIG. 32C is a sequence diagram of a procedure of recovering from performance deterioration (3)
Figure 32D:
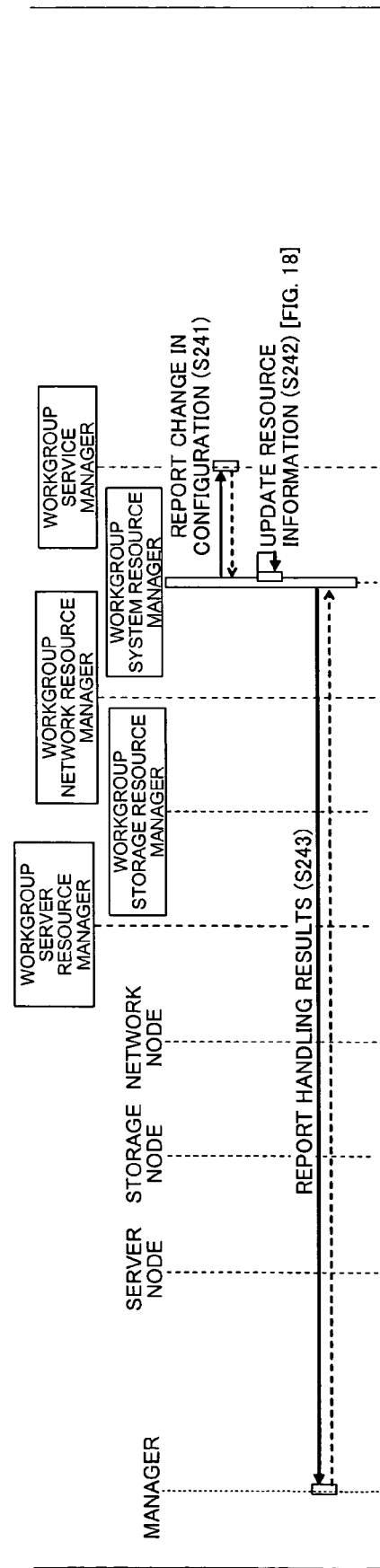
FIG. 32D is a sequence diagram of a procedure of recovering from performance deterioration (4)

FIG. 10 is a diagram of details of the policies. As shown in the drawing, the management policy includes an authentication policy, a billing policy, a reporting policy, etc. The operation policy includes a monitoring policy, an analytical policy, a provisioning policy, etc.

The information stored in the workgroup system DB 106 includes, in addition to the policies, the physical resources and their connecting relationship, the logical resources and their connecting relationship, a correspondence between the physical resources and the logical resources, a correspondence between the service layers and the resources, and a correspondence between the services and the resources in the autonomous control system.

FIG. 11 is a diagram of an example of a correspondence between the physical servers and model numbers. As shown in FIG. 11, the workgroup system DB 106 has stored therein information of each physical server associated with a model number.

FIG. 12 is a diagram of an example of model-number detailed information of the physical servers. As shown in the drawing, the workgroup system DB 106 has stored therein information of the model number of each physical server associated with a specification and a value in performance.

FIG. 13 is a diagram of an example of a correspondence between the physical networks and the model numbers. As shown in the drawing, the workgroup system DB 106 has stored therein information of each physical network associated with the model number.

FIG. 14 is a diagram of an example of model-number detailed information of the physical networks. As shown in the drawing, the workgroup system DB 106 has stored therein information of the model number of each physical network associated with a specification and a value in performance.

FIG. 15 is a diagram of an example of a correspondence between a physical storage and a model number. As shown in the drawing, the workgroup system DB 106 has stored therein information of each of the physical storages associated with the model number.

FIG. 16 is a diagram of an example of model-number detailed information of the physical storage. As shown in the drawing, the workgroup system DB 106 has stored therein information of the model number of each of the physical storages associated with a specification and a value in performance.

With the workgroup server/storage/network DB having stored therein the specification and the value in performance of each physical server/physical storage/physical network, the workgroup system resource manager 105 can select a physical server/physical storage/physical network required for each service layer from the shared pool.

FIG. 17 is a diagram of an example of a physical resource connecting relationship. As shown in the drawing, the workgroup system DB 106 has stored therein information of each link connecting between the physical resources associated with a link number, a connection source, and a connection destination.

FIG. 18 is a diagram of an example of physical-logical mapping. As shown in the drawing, the workgroup system DB 106 has stored therein a correspondence between the physical resources and the logical resources.

FIG. 19 is a diagram of an example of a correspondence between the logical servers and types. As shown in the drawing, the workgroup system DB 106 has stored therein information of each logical server associated with a type of the server.

FIG. 20 is a diagram of an example of type detailed information of the logical servers. As shown in the drawing, the workgroup system DB 106 has stored therein information of the type of each logical server associated with software to be incorporated and a required condition. As such, with the workgroup system DB 106 having stored therein the software to be incorporated and the required condition for each logical server, the workgroup system resource manager 105 can provide a logical server required for each service layer to the standby pool.

FIG. 21 is a diagram of an example of a correspondence between the logical network and the type. As shown in the drawing, the workgroup system DB 106 has stored therein information of each logical network associated with the type of the device.

FIG. 22 is a diagram of an example of type detailed information of the logical network. As shown in the drawing, the workgroup system DB 106 has stored therein information of the type of each logical network associated with a required condition.

FIG. 23 is a diagram of an example of a correspondence between a logical storage and a type. As shown in the drawing, the workgroup system DB 106 has stored therein information of each of the logical storages associated with the type of the device.

FIG. 24 is a diagram of an example of type detailed information of the logical storage. As shown in the drawing, the workgroup system DB 106 has stored therein information of the type of each of the logical storages associated with a required condition.

FIG. 25 is a diagram of an example of a logical resource connecting relationship. As shown in the drawing, the workgroup system DB 106 has stored therein information of each link connecting between the logical resources associated with a link number, a connection source, and a connection destination.

FIG. 26 is a diagram of an example of a correspondence between logical servers and service layers. As shown in the drawing, the workgroup system DB 106 has stored therein information of the service layers in which the respective logical servers operate.

FIG. 27 is a diagram of an example of a correspondence between a logical storage and service layers. As shown in the drawing, the workgroup system DB 106 has stored therein information of the service layers in which the logical storage operates.

FIG. 28 is a diagram of an example of a correspondence between a logical network and service layers. As shown in the drawing, the workgroup system DB 106 has stored therein information of the service layers in which the logical network operates.

FIG. 29 is a diagram of an example of a correspondence between services and resources. As shown in the drawing, the workgroup system DB 106 has stored therein, for each service and each service layer, information of logical resources in operation, logical resources registered in the standby pool, and physical resources registered in the bare metal pool.

FIG. 30 is a diagram of an example of physical servers registered in the shared pool. As shown in the drawing, the shared pool has registered therein physical servers for each model number. Also, physical networks and physical storages are registered in the shared pool for each model number.

Next, a recovering process of the autonomous control system according to the present embodiment is described by taking a server failure as an example of a failure. FIGS. 31A to 31D are sequential diagrams (1) to (4) of a procedure of recovering from a server failure. Here, the case where a failure occurs in the physical server "PSvr2" shown in FIG. 7 is described.

Also, in FIGS. 31A to 31D, at the upper-left corner of each frame, "alt" indicates a selecting process to be performed before and after a dotted line dividing the frame, "opt" indicates a process when a specified condition is satisfied, "par" indicates that processes divided by dotted lines are performed in parallel, and "ref" indicates another sequence diagram is to be referred to.

As shown in FIGS. 31A to 31D, in the autonomous control system according to the present embodiment, the node server resource manager 214 of "PSvr2" detects a failure in a component in the server, and reports as such to the node system resource manager 211. Then, the node system resource manager 211 determines that the process cannot be completely performed within the node, and sends a failure report to the workgroup system resource manager 105 of the management node 100 (step S101).

Then, the workgroup system resource manager 105 searches for a related physical resource by using the physical resource connecting relationship shown in FIG. 17 (step S102), and also searches for a related logical resource by using the correspondence between the physical resources and the logical resources shown in FIG. 18 and the logical resource connecting relationship shown in FIG. 25 (step S103).

Then, a related service is searched for by using the correspondence between the logical servers/logical storages/logical networks and the service layers shown in FIGS. 26 to 28 (step S104), and then reports a failed portion and a service to be influenced thereby to an administrator (step S105).

Then, by using the correspondence between the services and the resources shown in FIG. 29, it is determined whether an alternative candidate is present in the standby pool. If an alternative candidate is present, the alternative candidate is selected from the standby pool (step S106). In this example, "LSvr5" in the standby pool is selected.

On the other hand, if no alternative candidate is present in the standby pool, it is determined whether an alternative server is present in the bare metal pool. If an alternative server is present, the alternative candidate is selected from the bare metal pool (step S107), a system layout is generated by using the alternative resource (step S108), and then the generated system is verified (step S109).

On the other hand, if no alternative server is present in the bare metal pool, it is checked whether a degenerated operation is available. If the degenerated operation is available, a request for the degenerated operation is sent to the workgroup service manager 103 (step S110).

Then, each related node is instructed to perform the degenerated operation. That is, the related server node is instructed via the workgroup server resource manager 108 to perform the degenerated operation (step S111 to step S112), the related storage node is instructed via the workgroup storage resource manager 110 to perform the degenerated operation (step S113 to step S114), and the related network node is instructed via the workgroup network resource manager 112 to perform the degenerated operation (step S115 to step S116).

Here, as the related nodes, a node group that belongs to a service layer in which a failed node operates is mainly a target. In some cases, however, a node group of another layer of the same service may also be influenced.

Then, it is checked whether a flow amount control is available and necessary. If a flow amount control is available and necessary, the workgroup service manager 103 is requested to adjust the flow amount (step S117). The flow amount control means, for example, controlling the number of requests from a client to a server.

Then, the related nodes are instructed to perform the flow amount control. That is, the related server node is instructed via the workgroup server resource manager 108 to perform the flow amount control (step S118 to step S119), the related storage node is instructed via the workgroup storage resource manager 110 to perform the flow amount control (step S120 to step S121), and the related network node is instructed via the workgroup network resource manager 112 to perform the flow amount control (step S122 to step S123). Also, the degenerated operation is reported to the administrator (step S124).

On the other hand, if the degenerated operation is not available, the workgroup service manager 103 is requested to halt the service (step S125). Then, the related nodes are instructed to halt the service. That is, the related server node is instructed via the workgroup server resource manager 108 to halt the service (step S126 to step S127), the related storage node is instructed via the workgroup storage resource manager 110 to halt the service (step S128 to step S129), and the related network node is instructed via the workgroup network resource manager 112 to halt the service (step S130 to step S131). Also, the service halt is reported to the administrator (step S132).

Then, if the alternative resource has been secured, the related nodes are instructed to verify the configuration. That is, the related server node is instructed via the workgroup server resource manager 108 to check a server state (step S133 to step S134), the related storage node is instructed via the workgroup storage resource manager 110 to check a storage state (step S135 to step S136), and the related network node is instructed via the workgroup network resource manager 112 to check a network state (step S137 to step S138).

Then, a physical link is verified (step S139), and then the alternative candidate is displayed to the administrator (step S140). If the verification results in NG, the procedure again performs the process of obtaining an alternative candidate.

Then, the related nodes are instructed to change the setting. That is, the related server node is instructed via the workgroup server resource manager 108 to change the server setting (step S141 to step S142), the related storage node is instructed via the workgroup storage resource manager 110 to change the storage setting (step S143 to step S144), and the related network node is instructed via the workgroup network resource manager 112 to change the network setting (step S145 to step S146).

Then, the change in resource configuration is reported to the workgroup service manager 103 (step S147), and then the server node and the alternative node are instructed to start an application (step S148 to step S149). Also, concurrently with changing the setting of the related nodes, the resource pool is refilled with resources (step S150).

Then, the configuration change is reported to the workgroup service manager 103 (step S151), and the resource information is updated. Specifically, the correspondence between the logical resources and the physical resources shown in FIG. 18 is updated (step S152), and then the recovery from the failure is reported to the administrator (step S153).

In this manner, when a failure occurs in a resource within the system, the workgroup system resource manager 105 selects an alternative resource from the standby pool, and then verifies the system configuration and changes the setting, thereby allowing quick failure recovery.

FIGS. 32A to 32D are sequence diagrams (1) to (4) of a procedure of recovering from performance deterioration.

As shown in FIGS. 32A to 32D, in the autonomous control system according to the present embodiment, on detecting performance deterioration (step S201), the workgroup service manager 103 searches for a corresponding service by using the correspondence between the services and the resources shown in FIG. 29 (step S202), and then specifies a bottleneck (step S203). Then, the performance deterioration is reported to the workgroup system resource manager 105 (step S204).

Then, the workgroup system resource manager 105 searches for a related logical resource by using the logical resource connecting relationship shown in FIG. 25 (step S205), and also searches for a related physical resource by using the physical resource connecting relationship shown in FIG. 17 and the correspondence between the physical resources and the logical resources shown in FIG. 18 (step S206).

Then, performance information of each resource is collected. That is, server performance information is collected from the workgroup server resource manager 108 (step S207), storage performance information is collected from the workgroup storage resource manager 110 (step S208), and network performance information is collected from the workgroup network resource manager 112 (step S209). Then, a portion where performance deterioration occurred and its cause are specified, and reported to the administrator (step S210).

Then, by using the correspondence between the services and the resources shown in FIG. 29, it is determined whether an additional candidate is present in the standby pool. If an additional candidate is present, the additional candidate is selected from the standby pool (step S211).

On the other hand, if no additional candidate is present in the standby pool, it is determined whether an additional server is present in the bare metal pool. If an additional server is present, the additional candidate is selected from the bare metal pool (step S212), a system layout is generated by using the additional resource (step S213), and then the generated system is verified (step S214).

On the other hand, if no additional server is present in the bare metal pool, it is checked whether access control by controlling the flow amount is available. If access control by controlling the flow amount is available, the workgroup service manager 103 is requested to adjust the flow amount (step S215).

Then, the related nodes are instructed to control the flow amount. That is, the related server node is instructed via the workgroup server resource manager 108 to control the flow amount (step S216 to step S217), the related storage node is instructed via the workgroup storage resource manager 110 to control the flow amount (step S218 to step S219), and the related network node is instructed via the workgroup network resource manager 112 to control the flow amount (step S220 to step S221).

Then, if the additional resource has been allocated, the configuration of the logical resources is updated (step S222), and the related nodes are instructed to verify the configuration. That is, the related server node is instructed via the workgroup server resource manager 108 to check a server state (step S223 to step S224), the related storage node is instructed via the workgroup storage resource manager 110 to check a storage state (step S225 to step S226), and the related network node is instructed via the workgroup network resource manager 112 to check a network state (step S227 to step S228).

Then, a physical link is verified (step S229), and a handling plan is reported to the administrator (step S230). If the verification results in NG, the procedure again performs the process of obtaining an additional candidate.

Then, the related nodes are instructed to change the setting. That is, the related server node is instructed via the workgroup server resource manager 108 to change the server setting (step S231 to step S232), the related storage node is instructed via the workgroup storage resource manager 110 to change the storage setting (step S233 to step S234), and the related network node is instructed via the workgroup network resource manager 112 to change the network setting (step S235 to step S236).

Then, the change in resource configuration is reported to the workgroup service manager 103 (step S237), and then the server node and the additional node are instructed to start an application (step S238 to step S239). Also, concurrently with changing the setting of the related nodes, the resource pool is refilled with resources (step S240).

Then, the configuration change is reported to the workgroup service manager 103 (step S241), and the resource information is updated. Specifically, the correspondence between the logical resources and the physical resources shown in FIG. 18 is updated (step S242), and then the handling results are reported to the administrator (step S243).

In this manner, when performance deterioration occurs in the system, the workgroup system resource manager 105 specifies the portion where the performance deterioration occurred and its cause, selects an additional resource from the standby pool, verifies the system configuration and changes the setting, thereby allowing quick recovery.

Figure 33:
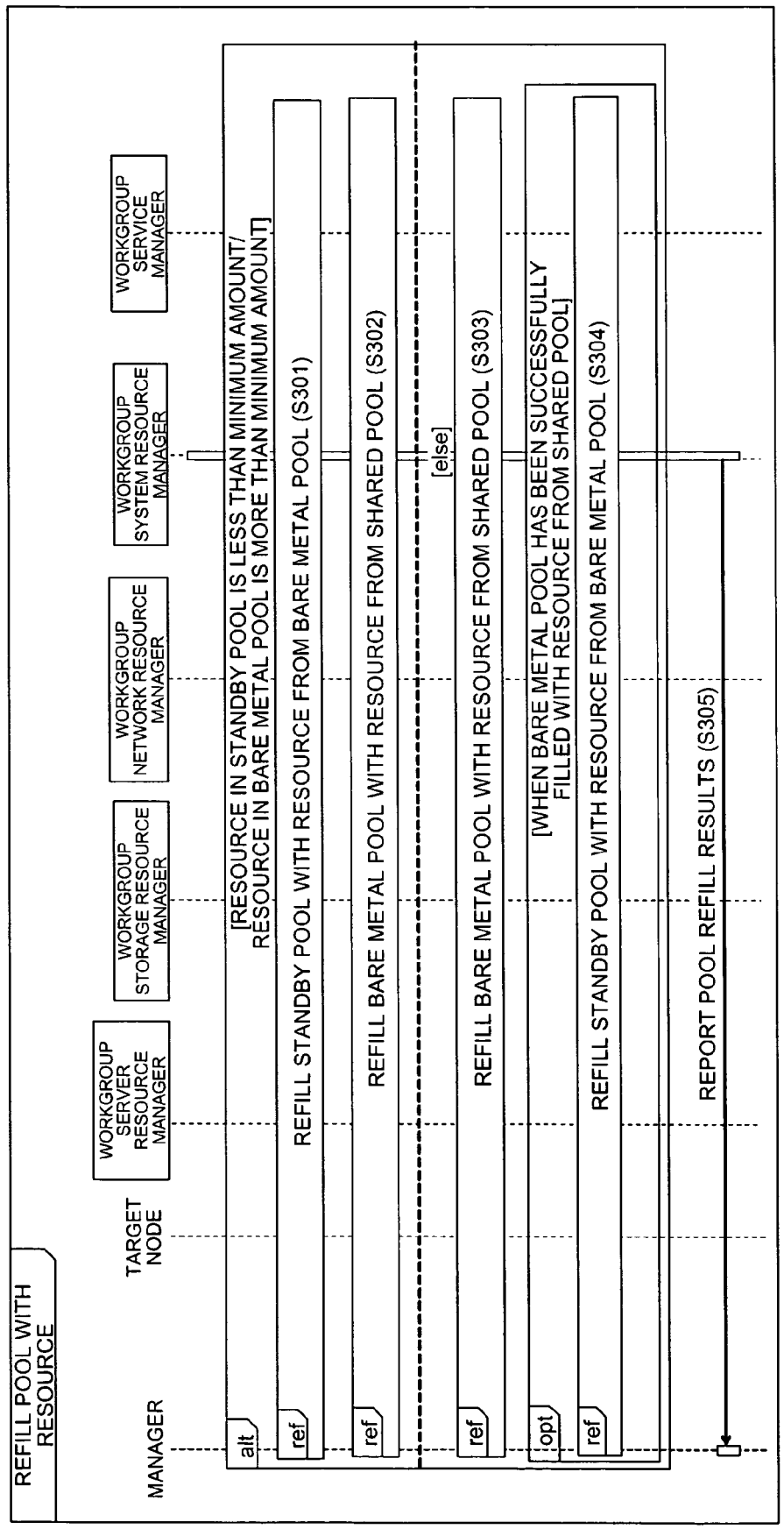
FIG. 33 is a sequence diagram of a procedure of refilling pools with resources.

FIG. 33 is a sequence diagram of the procedure of refilling the pools with resources. As shown in the drawing, in this process of refilling the pools with resources, the workgroup system resource manager 105 checks whether the resources in the standby pool are less than a minimum amount or whether the resources in the bare metal pool are more than the minimum amount. If the resources in the standby pool are less than the minimum amount or the resources in the bare metal pool are more than the minimum amount, the standby pool is refilled with a resource from the bare metal pool (step S301), and then the bare metal pool is refilled with a resource from the shared pool (step S302).

On the other hand, if the resources in the standby pool are not less than the minimum amount or the resources in the bare metal pool are not more than the minimum amount, first the bare metal pool is refilled with a resource from the shared pool (step S303). If the bare metal pool has been successfully refilled with a resource from the shared pool, the standby pool is refilled with a resource from the bare metal pool (step S304).

Then, the pool refilling results are reported to the administrator (step S305).

Figure 34:
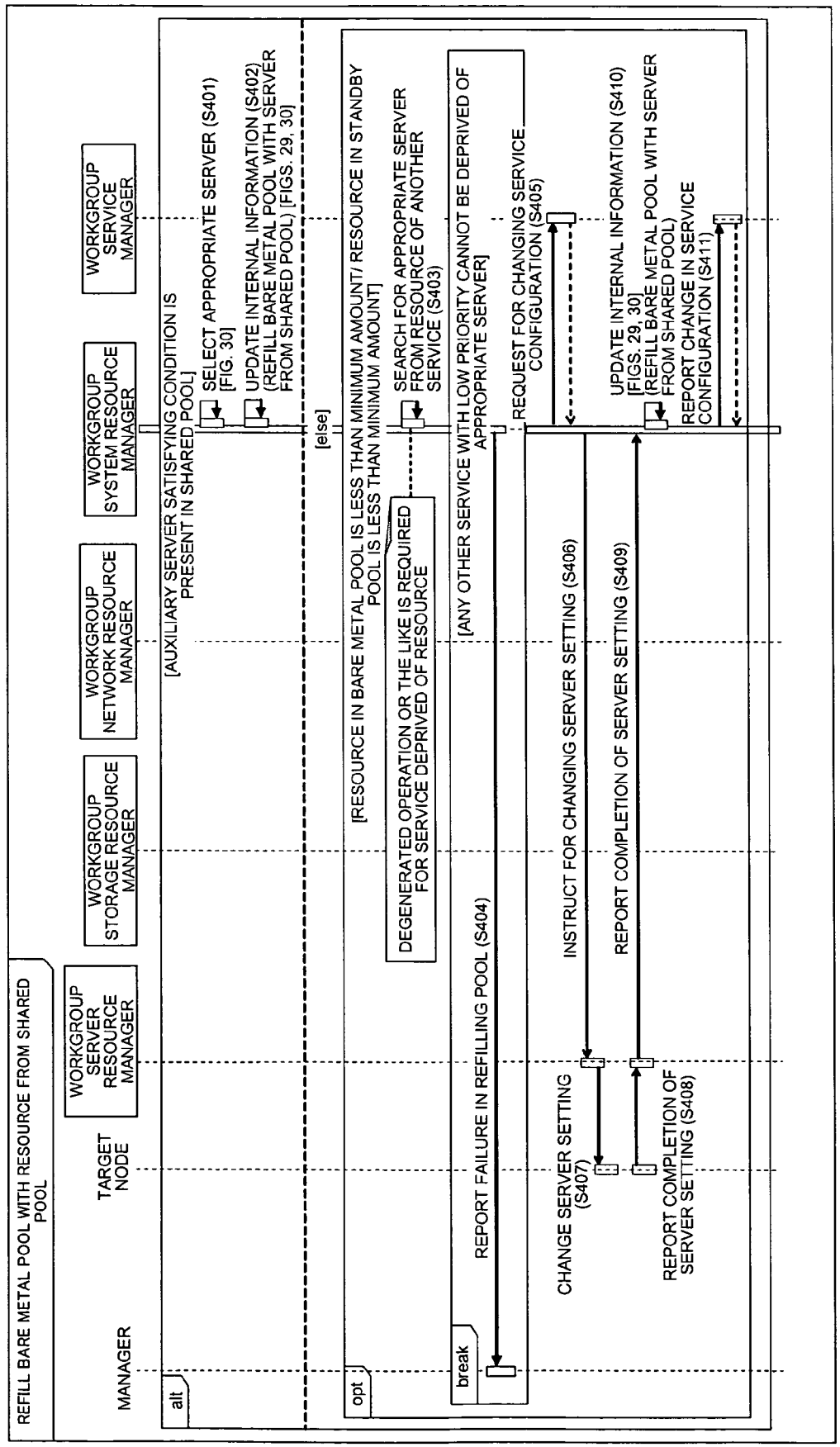
FIG. 34 is a sequence diagram of a procedure of refilling a bare metal pool with a resource from the shared pool.

FIG. 34 is a sequence diagram of a procedure of refilling the bare metal pool with a resource from the shared pool. In FIG. 34, "break" indicates a jump to a frame outside by one level.

In this resource refilling process, the workgroup system resource manager 105 determines whether an auxiliary server satisfying conditions is present in the shared pool. Determination whether an auxiliary server satisfying conditions is present in the shared pool is made by using the model number, specification, and value in performance of each resource shown in FIGS. 11 to 16.

Then, if an auxiliary server satisfying conditions is present in the shared pool, an appropriate server is selected from the shared pool shown in FIG. 30 (step S401), and the bare metal server is refilled with the server from the shared pool. Also, the correspondence between the services and the resources shown in FIG. 29 and the information of the shared pool shown in FIG. 30 are updated (step S402).

On the other hand, if no auxiliary server satisfying conditions is present in the shared pool, it is checked whether the resources in the bare metal pool is less than the minimum amount or whether the resources in the standby pool is less than the minimum amount. If the resources in the bare metal pool are less than the minimum amount or the resources in the standby pool are less than the minimum amount, the resources of another service are searched for an appropriate server (step S403).

It is then determined whether any other service with low priority can be deprived of an appropriate resource. If this is not possible, a failure in pool refilling is reported to the administrator (step S404), and the procedure ends.

On the other hand, if possible, the workgroup service manager 103 is requested to change the service configuration (step S405), and the target node is instructed via the workgroup server resource manager 108 to change the setting (step S406 to S407). Then, upon reception of a report of the completion of the setting via the workgroup server resource manager 108 (step S408 to step S409), the correspondence between the services and the resources shown in FIG. 29 and the information of the shared pool shown in FIG. 30 are updated (step S410), and then the change in the service configuration is reported to the workgroup service manager 103 (step S411).

In this manner, the workgroup system resource manager 105 determines whether an auxiliary resource satisfying the conditions is present in the shared pool by using the model number, specification, and value in performance of each resource. If an auxiliary resource satisfying the conditions is present, an appropriate resource is selected from the shared pool and is put in the bare metal pool for refilling. Thus, recovery from a failure and performance deterioration can be performed quickly.

Figure 35:
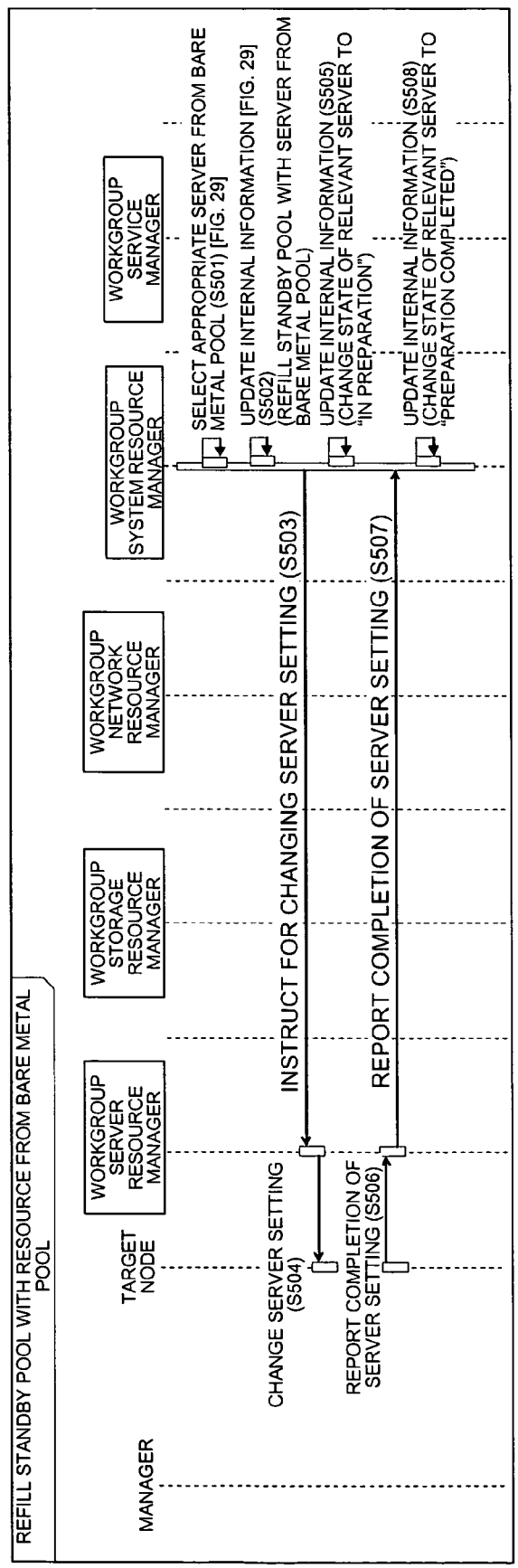
FIG. 35 is a sequence diagram of a procedure of refilling a standby pool with a resource from the bare metal pool.

FIG. 35 is a sequence diagram of a procedure of refilling a standby pool with a resource from the bare metal pool.

In this resource refilling process, the workgroup system resource manager 105 selects an appropriate server from the bare metal pool by using the correspondence between the services and the resources shown in FIG. 29 (step S501). Then, the standby pool is refilled with the server from the bare metal pool, and the correspondence between the services and the resources is updated (step S502).

Then, the target node is instructed via the workgroup server resource manager 108 to change the setting (step S503 to step S504), and the state of the target node is updated to "in preparation" (step S505).

Then, upon reception of a report of the completion of the setting from the target node via the workgroup server resource manager 108 (step S506 to step S507), the state of the target node is updated to "preparation completed" (step S508).

In this manner, the workgroup system resource manager 105 selects an appropriate resource from the bare metal pool for refilling the standby pool, and causes the resource to be in a preparation-completed state dedicated to the service layer, thereby achieving recovery from a failure or performance deterioration with a minimum response time.

FIGS. 36A and 36B are diagrams (1) and (2) of each function of monitoring & measurement, analysis, design, verification, and operation at failure in the autonomous control system according to the present embodiment. The drawings indicate a range subjected to monitoring & measurement, analysis, design, verification, and operation performed by each manager at failure, a function, and a flow of control.

For example, the workgroup system resource manager 105 specifies an influenced range by taking the entire system as a target range to be analyzed at failure, and then goes to (3)-(c), that is, a design step of the workgroup system resource manager 105.

Also, FIGS. 37A and 37B are diagrams (1) and (2) of each function of monitoring & measurement, analysis, design, verification, and operation at performance deterioration in the autonomous control system according to the present embodiment. The drawings indicate a range subjected to monitoring & measurement, analysis, design, verification, and operation performed by each manager at failure, a function, and a flow of control.

For example, the node service manager 212 collects performance information of middleware and load information for each server node/task, by taking the server node as a target range to be monitored and measured at performance deterioration, then goes to (10)-(b), that is, a analyzing step of the node service manager 212.

Figure 38:
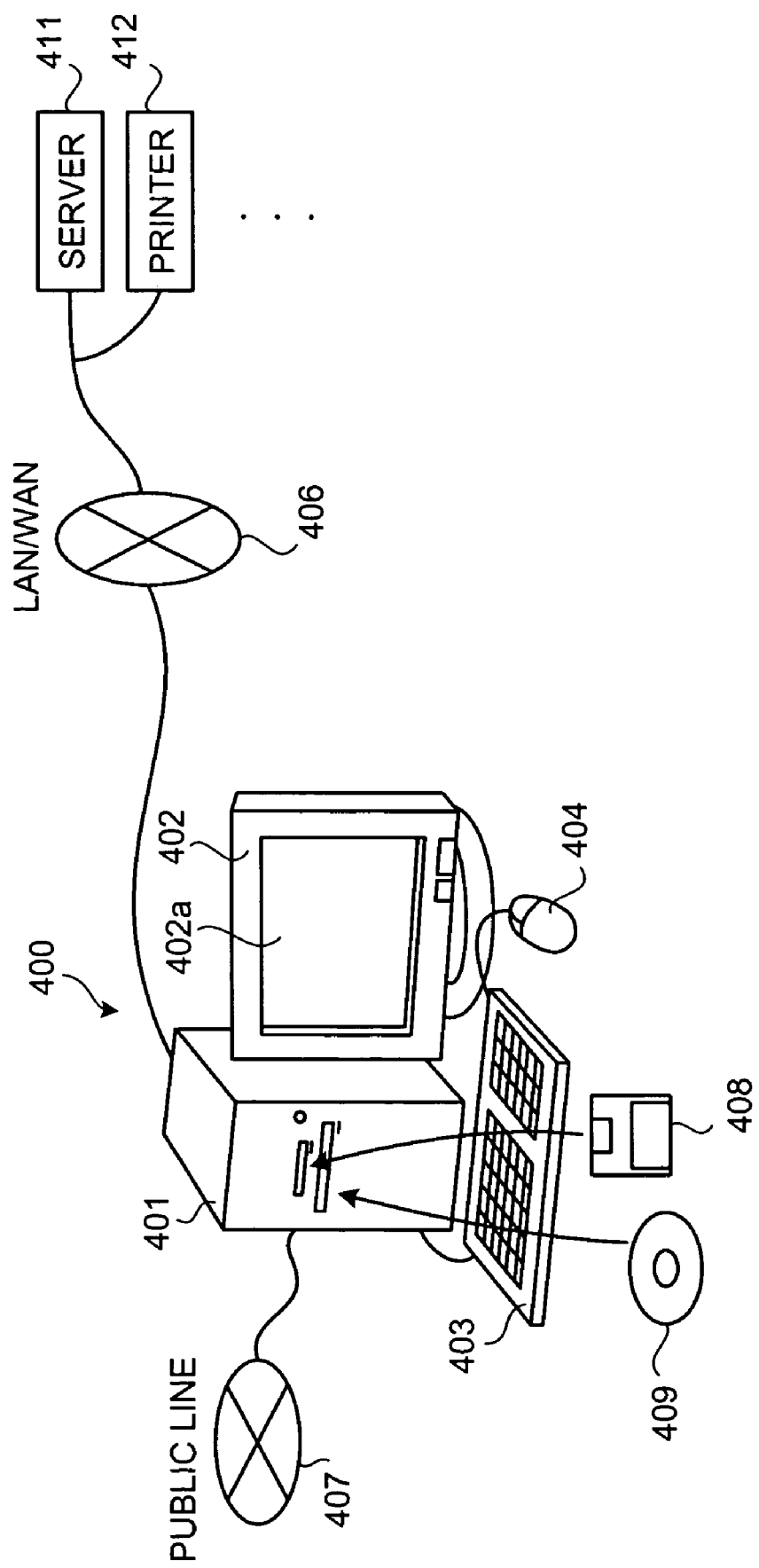
FIG. 38 is a diagram of an example of a computer system operating as a server node according to the present embodiment.

FIG. 38 is a diagram of an example of the computer system operating as the server node according to the present embodiment. As shown in the drawing, this computer system 400 includes a main unit 401, a display 402 that displays information on a display screen 402a upon instruction from the main unit 401, a keyboard 403 for inputting various information to this computer system 400, a mouse 404 that specifies an arbitrary position on the display screen 402a of the display 402, a LAN interface for connection to a LAN 406 or a wide area network (WAN), and a modem connected to a public line 407. Here, the LAN 406 connects another server 411, a printer 412, and others to the computer system 400.

Figure 39:
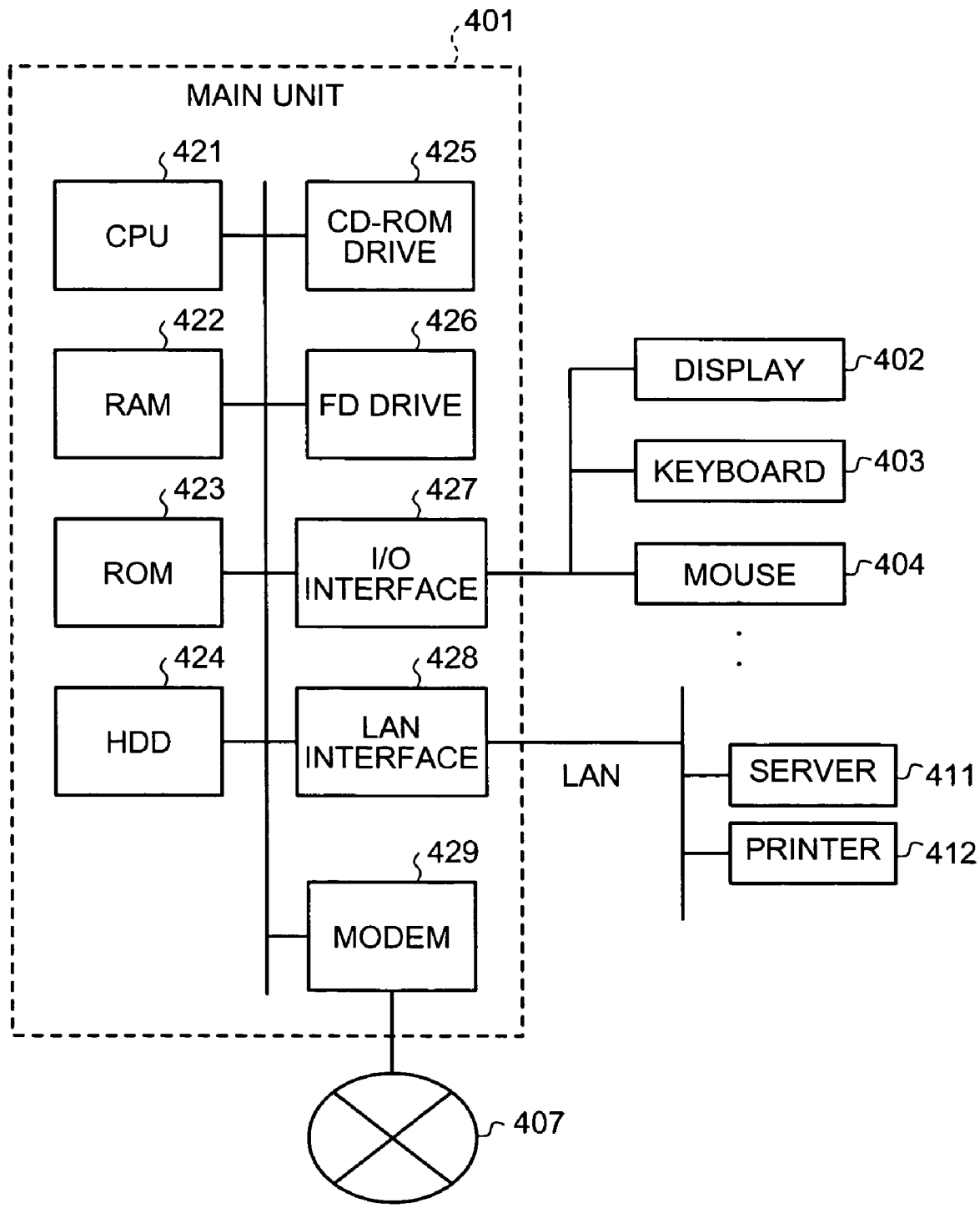
FIG. 39 is a functional block diagram of the configuration of a main unit shown in FIG. 38.

Also, FIG. 39 is a functional block diagram of the configuration of the main unit shown in FIG. 38. As shown in the drawing, this main unit 401 includes a CPU 421, a RAM 422, a ROM 423, a hard disk drive (HDD) 424, a CD-ROM drive 425, an FD drive 426, an I/O interface 427, a LAN interface 428, and a modem 429.

Then, an autonomous control program executed on this computer system 400 is stored in a portable storage medium, such as a floppy disk (FD) 408, a CD-ROM 409, a DVD disk, a magneto-optical disk, or an IC card, and is read therefrom to be installed onto the computer system 400.

Alternatively, this autonomous control program is stored in a database of the server 411 connected via the LAN interface 428 or the like, and is read therefrom to be installed onto the computer system 400.

Then, the installed autonomous control program is stored in the HDD 424, and is executed by the CPU 421 by using the RAM 422, the ROM 423, and the like.

According to the present embodiment, various policies are stored in the policy DB 102, and each node forming a system cooperates with another node and performs autonomous control based on the policies. Therefore, flexible autonomous control can be performed with respect to a failure or an abrupt load change.

Also, auxiliary resources are managed by using the shared pool, the bare metal pool, and the standby pool. Therefore, with the standby pool being mainly used for managing the resources, recovery from a failure or performance deterioration can be quickly performed. Furthermore, with the shared pool being mainly used for managing the resources, the resources can be efficiently used.

According to the present invention, autonomous control processes of different schemes are performed by changing the policies, thereby achieving an effect of performing flexible autonomous control according to the policies.

Furthermore, according to the present invention, recovery from a failure or handling of a load change is quickly performed by using the standby pool, thereby achieving an effect of attaining efficient autonomous control.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable storage medium tangibly embodying a computer program of instructions executable by a computer to autonomously control an information processing system made up of a plurality of information processing apparatuses including a server node, a network node, and a storage node, connected via a network, said autonomous control being carried out at each of the server node, the network node, and the storage node, and also over a plurality of these nodes, wherein each of the server node, the network node, and the storage node is hardware having incorporated therein software for the purpose of managing and controlling server resources in a single server device, the computer program making a computer execute:

reading a policy from a storage unit that stores the policy required for managing the information processing system; and performing an autonomous control that includes two loops based on the policy read, wherein the information processing system:

assigns the plurality of information processing apparatuses as resources to each of a plurality of service hierarchical layers forming a service model for a service to be provided, collects auxiliary resources, which are idle, to manage the auxiliary resources as a shared pool to be commonly used by the whole system, collects suitable ones of the auxiliary resources determined to be available in each of the service hierarchical layers from the shared pool to manage the suitable ones of the auxiliary resources as a bare metal pool, which is dedicated to each service layer and satisfies a required hardware standard and also having an appropriate physical wiring provided thereto, and selects a resource from the bare metal pool to complete preparation for use in each of the service hierarchical layers and collects the selected resource for each of the service hierarchical layers to manage the collected resources as a standby pool, which is also dedicated to each service layer, wherein the performing includes performing the autonomous control by searching for necessary auxiliary resources in order of the standby pool, the bare metal pool, and the shared pool, and wherein, when a failure occurs in a resource with within the system, an alternative resource is selected from the standby pool, and then a configuration of the system is varied and a setting is changed, thereby allowing quick failure recovery.

2. The computer-readable storage medium according to claim 1, wherein the policy includes:

a first policy for the entire information processing system; and a second policy for each of the information processing apparatuses.

3. The computer-readable storage medium according to claim 1, wherein the policy includes:

a first policy for a center that provides a service by operating the information processing system;

a second policy for a customer that uses the information processing system; and a third policy for a service provided by the information processing system.

4. The computer-readable storage medium according to claim 1, wherein a determination on which resource is available in each of the service hierarchical layers from among the resources in the shared pool is made based on a hardware specification and a physical connection of each of the resources.

5. The computer-readable storage medium according to claim 1, wherein the performing includes, when the auxiliary resource is used, refilling the standby pool and the bare metal pool in parallel with an operation of making the auxiliary resource be in an active state.

6. The computer-readable storage medium
    according to claim 1, wherein the service model is made up of a Front layer connecting the Internet and an intranet, a Web layer in which a web server is disposed, an AP layer in which an application server is disposed, and a DB layer in which a database server is disposed.

7. The computer-readable storage medium according to claim 1, wherein the performing includes, to perform the autonomous control, when a failure occurs in any one of the information processing apparatuses, selecting other information processing apparatus operable as an alternative apparatus to the any one of the information processing apparatuses from the auxiliary resources to recover from the failure; and when a load change exceeding a predetermined capacity occurs in the information processing system, performing reassignment of the resources.

8. The computer-readable storage medium according to claim 1, wherein the information processing system is made up of, as the information processing apparatus, a server, a storage, and a network device.

9. A computer-readable storage medium tangibly embodying a computer program of instructions executable by a computer to autonomously control an information processing system made up of a plurality of information processing apparatuses including a server node, a network node, and a storage node, connected via a network, said autonomous control being carried out at each of the server node, the network node, and the storage node, and also over a plurality of these nodes, wherein each of the server node, the network node, and the storage node is hardware having incorporated therein software for the purpose of managing and controlling server resources in a single server device, the computer program making a computer execute:

reading a policy from a storage unit that stores the policy required for managing the information processing system; and performing a control instruction to each of the information processing apparatuses based on the policy read, wherein an autonomous control loop functions at each of the information processing apparatuses, wherein the information processing system:

assigns the plurality of information processing apparatuses as resources to each of a plurality of service hierarchical layers forming a service model for a service to be provided, collects auxiliary resources, which are idle, to manage the auxiliary resources as a shared pool to be commonly used by the whole system, collects suitable ones of the auxiliary resources determined to be available in each of the service hierarchical layers from the shared pool to manage the suitable ones of the auxiliary resources as a bare metal pool, which is dedicated to each service layer and satisfies a required hardware standard and also having an appropriate physical wiring provided thereto, and selects a resource from the bare metal pool to complete preparation for use in each of the service hierarchical layers and collects the selected resource for each of the service hierarchical layers to manage the collected resources as a standby pool, which is also dedicated to each service layer, wherein the performing includes performing an autonomous control by searching for necessary auxiliary resources in order of the standby pool, the bare metal pool, and the shared pool, and wherein, when a failure occurs in a resource with within the system, an alternative resource is selected from the standby pool, and then a configuration of the system is varied and a setting is changed, thereby allowing quick failure recovery.

10. An apparatus for autonomously controlling an information processing system made up of a plurality of information processing apparatuses including a server node, a network node, and a storage node, connected via a network, said autonomous control being carried out at each of the server node, the network node, and the storage node, and also over a plurality of these nodes, wherein each of the server node, the network node, and the storage node is hardware having incorporated therein software for the purpose of managing and controlling server resources in a single server device, comprising:

an interface unit for use in communications with the plurality of information processing apparatuses via the network; and a controller comprising:

a policy storing unit that stores a policy required for managing the information processing system; and a control performing unit that performs an autonomous control that includes two loops based on the policy stored, wherein the information processing system:

assigns the plurality of information processing apparatuses as resources to each of a plurality of service hierarchical layers forming a service model for a service to be provided, collects auxiliary resources, which are idle, to manage the auxiliary resources as a shared pool to be commonly used by the whole system, collects suitable ones of the auxiliary resources determined to be available in each of the service hierarchical layers from the shared pool to manage the suitable ones of the auxiliary resources as a bare metal pool, which is dedicated to each service layer and satisfies a required hardware standard and also having an appropriate physical wiring provided thereto, and selects a resource from the bare metal pool to complete preparation for use in each of the service hierarchical layers and collects the selected resource for each of the service hierarchical layers to manage the collected resources as a standby pool, which is also dedicated to each service layer, wherein the control performing unit performs the autonomous control by searching for necessary auxiliary resources in order of the standby pool, the bare metal pool, and the shared pool, and wherein, when a failure occurs in a resource with within the system, an alternative resource is selected from the standby pool, and then a configuration of the system is varied and a setting is changed, thereby allowing quick failure recovery.

11. An apparatus for autonomously controlling an information processing system made up of a plurality of information processing apparatuses including a server node, a network node, and a storage node, connected via a network, said autonomous control being carried out at each of the server node, the network node, and the storage node, and also over a plurality of these nodes, wherein each of the server node, the network node, and the storage node is hardware having incorporated therein software for the purpose of managing and controlling server resources in a single server device, comprising:

an interface unit for use in communications with the plurality of information processing apparatuses via the network; and a controller comprising:

a policy storing unit that stores a policy required for managing the information processing system; and a control instructing unit that performs a control instruction to each of the information processing apparatuses based on the policy stored, wherein an autonomous control loop functions at each of the information processing apparatuses, wherein the information processing system:

assigns the plurality of information processing apparatuses as resources to each of a plurality of service hierarchical layers forming a service model for a service to be provided, collects auxiliary resources, which are idle, to manage the auxiliary resources as a shared pool to be commonly used by the whole system, collects suitable ones of the auxiliary resources determined to be available in each of the service hierarchical layers from the shared pool to manage the suitable ones of the auxiliary resources as a bare metal pool, which is dedicated to each service layer and satisfies a required hardware standard and also having an appropriate physical wiring provided thereto, and selects a resource from the bare metal pool to complete preparation for use in each of the service hierarchical layers and collects the selected resource for each of the service hierarchical layers to manage the collected resources as a standby pool, which is also dedicated to each service layer, wherein the autonomous control loop searches for necessary auxiliary resources in order of the standby pool, the bare metal pool, and the shared pool, and wherein, when a failure occurs in a resource with within the system, an alternative resource is selected from the standby pool, and then a configuration of the system is varied and a setting is changed, thereby allowing quick failure recovery.

12. A method of autonomously controlling an information processing system made up of a plurality of information processing apparatuses including a server node, a network node, and a storage node, connected via a network, said autonomous control being carried out at each of the server node, the network node, and the storage node, and also over a plurality of these nodes, wherein each of the server node, the network node, and the storage node is hardware having incorporated therein software for the purpose of managing and controlling server resources in a single server device, comprising:

reading a policy from a storage unit that stores the policy required for managing the information processing system; and performing an autonomous control that includes two loops based on the policy read, wherein the information processing system assigns the plurality of information processing apparatuses as resourcea to each of a plurality of service hierarchical layers forming a service model for a service to be provided, collects auxiliary resources, which are idle, to manage the auxiliary resources as a shared pool to be commonly used by the whole system, collects suitable ones of the auxiliary resources determined to be available in each of the service hierarchical layers from the shared pool to manage the suitable ones of the auxiliary resources as a bare metal pool, which is dedicated to each service layer and satisfies a required hardware standard and also having an appropriate physical wiring provided thereto, and selects a resource from the bare metal pool to complete preparation for use in each of the service hierarchical layers and collects the selected resource for each of the service hierarchical layers to manage the collected resources as a standby pool, which is also dedicated to each service layer, wherein the performing includes performing the autonomous control by searching for necessary auxiliary resources in order of the standby pool, the bare metal pool, and the shared pool, and wherein, when a failure occurs in a resource with within the system, an alternative resource is selected from the standby pool, and then the system configuration is varied and the setting is changed, thereby allowing quick failure recovery.

13. A method of autonomously controlling an information processing system made up of a plurality of information processing apparatuses including a server node, a network node, and a storage node, connected via a network, said autonomous control being carried out at each of the server node, the network node, and the storage node, and also over a plurality of these nodes, wherein each of the server node, the network node, and the storage node is hardware having incorporated therein software for the purpose of managing and controlling server resources in a single server device, comprising:

reading a policy from a storage unit that stores the policy required for managing the information processing system; and performing a control instruction to each of the information processing apparatuses based on the policy read, wherein an autonomous control loop functions at each of the information processing apparatuses, wherein the information processing system:

assigns the plurality of information processing apparatuses as resources to each of a plurality of service hierarchical layers forming a service model for a service to be provided, collects auxiliary resources, which are idle, to manage the auxiliary resources as a shared pool to be commonly used by the whole system, collects suitable ones of the auxiliary resources determined to be available in each of the service hierarchical layers from the shared pool to manage the suitable ones of the auxiliary resources as a bare metal pool, which is dedicated to each service layer and satisfies a required hardware standard and also having an appropriate physical wiring provided thereto, and selects a resource from the bare metal pool to complete preparation for use in each of the service hierarchical layers and collects the selected resource for each of the service hierarchical layers to manage the collected resources as a standby pool, which is also dedicated to each service layer, wherein the autonomous control loop searches for necessary auxiliary resources in order of the standby pool, the bare metal pool, and the shared pool, and wherein, when a failure occurs in a resource with within the system, an alternative resource is selected from the standby pool, and then a configuration of the system is varied and a setting is changed, thereby allowing quick failure recovery.

* * * * *